(12) United States Patent
Rajaraman et al.

(10) Patent No.: US 8,606,002 B2
(45) Date of Patent: *Dec. 10, 2013

(54) APPARATUS, METHOD AND ARTICLE FOR EVALUATING A STACK OF OBJECTS IN AN IMAGE

(75) Inventors: Arun Rajaraman, Reno, NV (US); Christopher P. Arbogast, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/618,846

(22) Filed: Sep. 14, 2012

(65) Prior Publication Data

US 2013/0071014 A1 Mar. 21, 2013

Related U.S. Application Data

(63) Continuation of application No. 12/820,885, filed on Jun. 22, 2010, now Pat. No. 8,285,034.

(60) Provisional application No. 61/397,694, filed on Aug. 26, 2009.

(51) Int. Cl.
*G06K 9/00* (2006.01)

(52) U.S. Cl.
USPC .......................................... 382/165

(58) Field of Classification Search
USPC ......... 382/162–167, 100, 135–139, 192, 194, 382/190, 199; 250/222.1–222.2, 559.47; 414/901; 235/379, 435, 375
See application file for complete search history.

(56) References Cited

U.S. PATENT DOCUMENTS 3,766,452 A 10/1973 Burpee et al.
3,810,172 A 5/1974 Burpee et al.
(Continued)

FOREIGN PATENT DOCUMENTS

DE 4439502 C1 9/1995
DE 19748930 A1 5/1998
(Continued)

OTHER PUBLICATIONS

Bally TMS, "MP21—Automated Table Tracking/Features," 2 pages, Nov. 2005.

(Continued)

*Primary Examiner* — Ishrat I Sherali
(74) *Attorney, Agent, or Firm* — Frank Abramonte; Fearon Brown; Marvin Hein

(57) ABSTRACT

An evaluation system to determine a value of a stack of objects preprocess a pixelated color image to produce a set of two color contour data, processes the two color contour data to identify a location of a top and a bottom of the stack, and locates, for each of the objects in the stack, a respective set of color pixels from the pixelated color image corresponding to each object based on the identified locations of the top and bottom of the stack. Each of the objects in the stack are then classified into a color classification based on the object's respective set of color pixels, and the value of the object is determined based on a known correspondence between the color classification and a value. The cumulative value of the stack is determined by summing the determined values for each of the objects in the stack.

21 Claims, 16 Drawing Sheets

(56) References Cited

U.S. PATENT DOCUMENTS

| | | | |
|---|---|---|---|
| 4,026,309 A | 5/1977 | Howard | |
| 4,531,187 A | 7/1985 | Uhland | |
| 4,636,846 A | 1/1987 | Villarreal | |
| 4,656,463 A | 4/1987 | Anders et al. | |
| 4,693,480 A | 9/1987 | Smith | |
| 4,755,941 A | 7/1988 | Bacchi | |
| 4,814,589 A | 3/1989 | Storch et al. | |
| 4,861,041 A | 8/1989 | Jones et al. | |
| 4,926,996 A | 5/1990 | Eglise et al. | |
| 5,007,641 A | 4/1991 | Seidman | |
| 5,103,081 A | 4/1992 | Fisher et al. | |
| 5,166,502 A | 11/1992 | Rendleman et al. | |
| 5,216,234 A | 6/1993 | Bell | |
| 5,258,837 A | 11/1993 | Gormley | |
| 5,283,422 A | 2/1994 | Storch et al. | |
| 5,321,241 A | 6/1994 | Craine | |
| 5,364,104 A | 11/1994 | Jones et al. | |
| 5,397,133 A | 3/1995 | Penzias | |
| 5,406,264 A | 4/1995 | Plonsky et al. | |
| 5,416,308 A | 5/1995 | Hood et al. | |
| 5,458,333 A | 10/1995 | Takemoto et al. | |
| 5,534,690 A * | 7/1996 | Goldenberg et al. | 250/222.1 |
| 5,586,936 A | 12/1996 | Bennett et al. | |
| 5,605,334 A | 2/1997 | McCrea, Jr. | |
| 5,613,912 A | 3/1997 | Slater | |
| 5,645,486 A | 7/1997 | Nagao et al. | |
| 5,651,548 A | 7/1997 | French et al. | |
| 5,676,376 A | 10/1997 | Valley | |
| 5,707,287 A | 1/1998 | McCrea, Jr. | |
| 5,735,525 A | 4/1998 | McCrea, Jr. | |
| 5,735,742 A | 4/1998 | French | |
| 5,742,656 A | 4/1998 | Mikulak et al. | |
| 5,755,618 A | 5/1998 | Mothwurf | |
| 5,757,876 A | 5/1998 | Dam et al. | |
| 5,770,533 A | 6/1998 | Franchi | |
| 5,781,647 A | 7/1998 | Fishbine et al. | |
| 5,785,321 A | 7/1998 | van Putten et al. | |
| 5,788,574 A | 8/1998 | Ornstein et al. | |
| 5,796,868 A | 8/1998 | Dutta-Choudhury | |
| 5,801,766 A | 9/1998 | Alden | |
| 5,803,808 A | 9/1998 | Strisower | |
| 5,809,482 A | 9/1998 | Strisower | |
| 5,823,534 A | 10/1998 | Banyai | |
| 5,831,669 A | 11/1998 | Adrain | |
| 5,842,921 A | 12/1998 | Mindes et al. | |
| 5,895,321 A | 4/1999 | Gassies et al. | |
| 5,909,876 A | 6/1999 | Brown | |
| 5,911,626 A | 6/1999 | McCrea, Jr. | |
| 5,919,090 A | 7/1999 | Mothwurf | |
| 5,924,926 A | 7/1999 | Brown | |
| 5,931,731 A | 8/1999 | Chwalisz | |
| 5,936,527 A | 8/1999 | Isaacman et al. | |
| 5,941,769 A | 8/1999 | Order | |
| 5,957,776 A | 9/1999 | Hoehne | |
| 6,021,949 A | 2/2000 | Boiron | |
| 6,029,891 A | 2/2000 | Freeman et al. | |
| 6,093,103 A | 7/2000 | McCrea, Jr. | |
| 6,117,012 A | 9/2000 | McCrea, Jr. | |
| 6,126,166 A | 10/2000 | Lorson et al. | |
| 6,154,131 A | 11/2000 | Jones, II et al. | |
| 6,165,069 A | 12/2000 | Sines et al. | |
| 6,166,763 A | 12/2000 | Rhodes et al. | |
| 6,186,895 B1 | 2/2001 | Oliver | |
| 6,200,218 B1 | 3/2001 | Lindsay | |
| 6,217,447 B1 | 4/2001 | Lofink et al. | |
| 6,234,898 B1 | 5/2001 | Belamant et al. | |
| 6,254,484 B1 | 7/2001 | McCrea, Jr. | |
| 6,264,109 B1 | 7/2001 | Chapet et al. | |
| 6,267,671 B1 | 7/2001 | Hogan | |
| 6,283,856 B1 | 9/2001 | Mothwurf | |
| 6,299,534 B1 | 10/2001 | Breeding et al. | |
| 6,313,871 B1 | 11/2001 | Schubert | |
| 6,346,044 B1 | 2/2002 | McCrea, Jr. | |
| 6,352,261 B1 | 3/2002 | Brown | |
| 6,425,817 B1 | 7/2002 | Momemy | |
| 6,446,864 B1 | 9/2002 | Kim et al. | |
| 6,457,715 B1 | 10/2002 | Friedman | |
| 6,460,848 B1 | 10/2002 | Soltys et al. | |
| 6,464,584 B2 | 10/2002 | Oliver | |
| 6,483,519 B1 | 11/2002 | Long et al. | |
| 6,503,147 B1 | 1/2003 | Stockdale et al. | |
| 6,508,709 B1 | 1/2003 | Karmarkar | |
| 6,514,140 B1 | 2/2003 | Storch | |
| 6,517,435 B2 | 2/2003 | Soltys et al. | |
| 6,517,436 B2 | 2/2003 | Soltys et al. | |
| 6,517,437 B1 | 2/2003 | Wells et al. | |
| 6,520,857 B2 | 2/2003 | Soltys et al. | |
| 6,527,271 B2 | 3/2003 | Soltys et al. | |
| 6,530,836 B2 | 3/2003 | Soltys et al. | |
| 6,530,837 B2 | 3/2003 | Soltys et al. | |
| 6,532,297 B1 | 3/2003 | Lindquist | |
| 6,533,276 B2 | 3/2003 | Soltys et al. | |
| 6,533,662 B2 | 3/2003 | Soltys et al. | |
| 6,567,159 B1 | 5/2003 | Corech | |
| 6,575,834 B1 | 6/2003 | Lindo | |
| 6,579,180 B2 | 6/2003 | Soltys et al. | |
| 6,579,181 B2 | 6/2003 | Soltys et al. | |
| 6,581,747 B1 | 6/2003 | Charlier et al. | |
| 6,595,857 B2 | 7/2003 | Soltys et al. | |
| 6,620,046 B2 | 9/2003 | Rowe | |
| 6,626,750 B2 | 9/2003 | Momemy | |
| 6,629,591 B1 | 10/2003 | Griswold et al. | |
| 6,629,889 B2 | 10/2003 | Mothwurf | |
| 6,638,161 B2 | 10/2003 | Soltys et al. | |
| 6,645,077 B2 | 11/2003 | Rowe | |
| 6,663,490 B2 | 12/2003 | Soltys et al. | |
| 6,678,402 B2 | 1/2004 | Jones et al. | |
| 6,683,321 B2 * | 1/2004 | Livingston et al. | 250/559.47 |
| 6,685,564 B2 | 2/2004 | Oliver | |
| 6,688,979 B2 | 2/2004 | Soltys et al. | |
| 6,690,156 B1 | 2/2004 | Weiner et al. | |
| 6,702,291 B2 | 3/2004 | Grebler et al. | |
| 6,712,696 B2 | 3/2004 | Soltys et al. | |
| 6,726,099 B2 | 4/2004 | Becker et al. | |
| 6,729,956 B2 | 5/2004 | Wolf et al. | |
| 6,755,741 B1 | 6/2004 | Rafaeli | |
| 6,758,751 B2 | 7/2004 | Soltys et al. | |
| 6,848,994 B1 | 2/2005 | Knust et al. | |
| 7,005,985 B1 | 2/2006 | Steeves | |
| 7,029,009 B2 | 4/2006 | Grauzer et al. | |
| 7,077,332 B2 | 7/2006 | Verschuur et al. | |
| 7,147,558 B2 | 12/2006 | Giobbi | |
| 7,213,812 B2 | 5/2007 | Schubert et al. | |
| 7,271,727 B2 | 9/2007 | Steeves | |
| 7,303,475 B2 | 12/2007 | Britt et al. | |
| 7,309,065 B2 | 12/2007 | Yoseloff et al. | |
| 7,316,615 B2 | 1/2008 | Soltys et al. | |
| 7,351,145 B1 | 4/2008 | Ornstein et al. | |
| 7,382,910 B2 * | 6/2008 | Donders | 382/135 |
| 7,390,256 B2 | 6/2008 | Soltys et al. | |
| 7,404,765 B2 | 7/2008 | Soltys et al. | |
| 7,407,438 B2 | 8/2008 | Schubert et al. | |
| 7,559,839 B2 | 7/2009 | Bahar | |
| 7,686,681 B2 | 3/2010 | Soltys et al. | |
| 7,736,236 B2 | 6/2010 | Soltys et al. | |
| 7,753,779 B2 | 7/2010 | Shayesteh | |
| 7,753,781 B2 | 7/2010 | Storch | |
| 7,771,272 B2 | 8/2010 | Soltys et al. | |
| 7,846,020 B2 | 12/2010 | Walker et al. | |
| 7,862,425 B2 | 1/2011 | Cavagna | |
| 8,103,083 B2 * | 1/2012 | Schaede et al. | 382/135 |
| 8,147,316 B2 | 4/2012 | Arezina et al. | |
| 8,162,125 B1 | 4/2012 | Csulits et al. | |
| 8,172,674 B2 | 5/2012 | Koyama | |
| 8,285,034 B2 * | 10/2012 | Rajaraman et al. | 382/162 |
| 2002/0063389 A1 | 5/2002 | Breeding et al. | |
| 2002/0142846 A1 | 10/2002 | Paulsen | |
| 2003/0195037 A1 | 10/2003 | Vuong et al. | |
| 2003/0212597 A1 | 11/2003 | Ollins | |
| 2003/0232651 A1 | 12/2003 | Huard et al. | |
| 2004/0005920 A1 | 1/2004 | Soltys et al. | |
| 2004/0043820 A1 | 3/2004 | Schlottmann | |
| 2004/0087375 A1 | 5/2004 | Gelinotte | |
| 2004/0142743 A1 | 7/2004 | Oliver | |

(56) References Cited

U.S. PATENT DOCUMENTS

| | | |
|---|---|---|
| 2004/0219982 A1 | 11/2004 | Khoo et al. |
| 2004/0229682 A1 | 11/2004 | Gelinotte |
| 2004/0259630 A1 | 12/2004 | Huard et al. |
| 2005/0026680 A1 | 2/2005 | Gururajan |
| 2005/0051965 A1 | 3/2005 | Gururajan |
| 2005/0054408 A1 | 3/2005 | Steil et al. |
| 2005/0059479 A1 | 3/2005 | Soltys et al. |
| 2005/0116020 A1 | 6/2005 | Smolucha et al. |
| 2005/0164761 A1 | 7/2005 | Tain |
| 2005/0282623 A1 | 12/2005 | Matsuno et al. |
| 2005/0288083 A1 | 12/2005 | Downs, III |
| 2005/0288084 A1 | 12/2005 | Schubert |
| 2005/0288085 A1 | 12/2005 | Schubert et al. |
| 2006/0019739 A1 | 1/2006 | Soltys et al. |
| 2006/0178185 A1 | 8/2006 | Weis |
| 2006/0199649 A1 | 9/2006 | Soltys et al. |
| 2006/0205508 A1 | 9/2006 | Green |
| 2007/0004500 A1 | 1/2007 | Soltys et al. |
| 2007/0015583 A1 | 1/2007 | Tran |
| 2007/0057469 A1 | 3/2007 | Grauzer et al. |
| 2007/0060307 A1 | 3/2007 | Mathis et al. |
| 2007/0111775 A1 | 5/2007 | Yoseloff |
| 2007/0243927 A1 | 10/2007 | Soltys |
| 2007/0243935 A1 | 10/2007 | Huizinga |
| 2008/0076536 A1 | 3/2008 | Shayesteh |
| 2008/0113781 A1 | 5/2008 | Soltys et al. |
| 2008/0217851 A1 | 9/2008 | Colton |
| 2009/0005176 A1 | 1/2009 | Morrow et al. |
| 2009/0021516 A1 | 1/2009 | Graziani et al. |
| 2009/0093293 A1 | 4/2009 | Koyama et al. |
| 2009/0115133 A1 | 5/2009 | Kelly et al. |
| 2009/0117994 A1 | 5/2009 | Kelly et al. |
| 2009/0118001 A1 | 5/2009 | Kelly et al. |
| 2009/0118005 A1 | 5/2009 | Kelly et al. |
| 2010/0016068 A1 | 1/2010 | White et al. |
| 2010/0125851 A1 | 5/2010 | Singh et al. |
| 2010/0234104 A1 | 9/2010 | Ruppert et al. |

FOREIGN PATENT DOCUMENTS

| | | |
|---|---|---|
| EP | 0327069 A2 | 8/1989 |
| EP | 0790848 B1 | 8/1997 |
| FR | 2775196 A1 | 8/1999 |
| GB | 2382034 A | 5/2003 |
| WO | 96/03188 A1 | 2/1996 |
| WO | 96/14115 A1 | 5/1996 |
| WO | 96/36253 A1 | 11/1996 |
| WO | 97/13227 A1 | 4/1997 |
| WO | 00/22585 A2 | 4/2000 |
| WO | 02/05914 A1 | 1/2002 |
| WO | 02/101630 A1 | 12/2002 |
| WO | 03/060846 A2 | 7/2003 |
| WO | 04/001709 A2 | 12/2003 |
| WO | 2009/071526 A1 | 6/2009 |

OTHER PUBLICATIONS

Bally TMS, "MPLite—Table Management System/Features," 2 pages, Nov. 2005.

Bravo Gaming Systems, "Casino Table Wager Analysis and Player Tracking System—Table Operations/Unique Features," accessed Apr. 11, 2005, URL = http://www.genesisgaming.com, 4 pages.

Bulavsky, J., "Tracking the Tables," *Casino Journal*, May 2004, pp. 44-47, accessed Dec. 21, 2005, URL = http://www.ascendgaming.com/cj/vendors_manufacturers_table/Trackin916200411141AM.htm, 5 pages.

Burke, A., "Tracking the Tables," reprinted from *International Gaming & Wagering Business*, Aug. 2003, 4 pages.

Casino Software & Services, LLC., accessed Aug. 25, 2006, URL = http:/casinosoftware.com/home.html, 6 pages.

*Gambling Magazine*, "Gaming Company Takes RFID to the Casino," Dec. 27, 2004, accessed Aug. 25, 2006, URL = http:/www.gamblingmagazine.com/managearticle.asp?C=290&A=13186, 4 pages.

Gros, R., "All You Ever Wanted to Know About Table Games," reprinted from *Global Gaming Business*, Aug. 1, 2003, 2 pages.

MagTek, "Port Powered Swipe Reader," Technical Reference Manual, Manual Part No. 99875094 Rev 12, Jun. 2003, 20 pages.

Mikohn, "Mikohn Tablelink—The Industry's Premier Table Tracking Solution Delivers Improvements Straight to the Bottom Line," 2 pages, before Jan. 1, 2004.

Mikohn, "Tablelink™, The New Standard in Table Games," before Jan. 1, 2004, 14 pages.

Palermo, V. "Near-field magnetic comms emerges," EE Times Design, Oct. 31, 2003.

Pro, L.V., "Book Review—The Card Counter's Guide to Casino Surveillance," *Blackjack Insider Newsletter*, May 2003, #40, accessed Aug. 25, 2006, URL = http:/bjinsider.com/newsletter_40_surveillance.shtml, 5 pages.

Rajaraman, "Apparatus, Method and Article for Evaluating a Stack of Objects in an Image," U.S. Appl. No. 61/397,694, filed Aug. 26, 2009, 82 pages.

Rajaraman et al., "Apparatus, Method and Article for Evaluating a Stack of Objects in an Image," Notice of Allowance for U.S. Appl. No. 12/820,885, mailed Jun. 7, 2012, 8 pages.

Rajaraman et al., "Apparatus, Method and Article for Evaluating a Stack of Objects in an Image," Preliminary Amendment for U.S. Appl. No. 61/397,694, filed Sep. 3, 2010, 3 pages.

Search Report and Written Opinion for corresponding Singapore Application No. 201005850-1, mailed Apr. 13, 2011, 10 pages.

Shuffle Master, Inc., "Shuffle Master Announces New Products; Intelligent Table System to Be Debuted at G2E," Sep. 10, 2003, 2 pages.

Shuffle Master, Inc., "Shuffle Master Gaming Presents the Ultimate Player Rating System . . . Bloodhound Sniffs Out the Pros and Cons," Dec. 31, 1997, 6 pages.

Snyder, A., "The High-Tech Eye," excerpt from *Blackjack Forum*, Spring 1997, accessed Dec. 21, 2005, from Casino Software & Services, LLC, URL = http://www.casinosoftware.com/bj_forum.html.

Terdiman, D., "Who's Holding the Aces Now?", reprinted from *Wired News*, Aug. 18, 2003, 2 pages.

Ward, K., "BJ Tracking System has Players Down for the Count," *Gaming Today*, Mar. 5, 2002, accessed Dec. 21, 2005, from Casino Software & Services, LLC, URL = http://www.casinosoftware.com/gaming_today.html.

Winkler, C., "Product Spotlight: MindPlay," reprinted from *Gaming and Leisure Technology*, Fall 2003, 2 pages.

US 6,599,191, 07/2003, Breeding et al. (withdrawn)

\* cited by examiner

APPARATUS, METHOD AND ARTICLE FOR EVALUATING A STACK OF OBJECTS IN AN IMAGE

CROSS-REFERENCE TO RELATED APPLICATION

This application is a continuation of U.S. application Ser. No. 12/820,885, filed Jun. 22, 2010, and claims the benefit under 35 U.S.C. §119(e) of U.S. Provisional Patent Application Ser. No. 61/397,694 filed Aug. 26, 2009 (previously U.S. Nonprovisional patent application Ser. No. 12/548,289 and converted by Petition To Convert granted by Decision with notification date of Apr. 29, 2010); where this provisional application is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field

This disclosure generally relates to image processing, and particularly to computationally processing images of a stack of objects.

2. Description of the Related Art

Many businesses need to verify, inventory account or otherwise evaluate for merchandise, currency, tokens or other objects in the course of the operations of the business.

For example, a business may need to verify, inventory or account for merchandise in a warehouse, which may be stacked in one or more stacks. Such merchandise may be in containers, for example boxes, or may not. The merchandise may be associated with a value, for instance a monetary value. A business may need to verify, inventory or account for coins, tokens or chips, each of which may be associated with some value, for instance of monetary value. Such coins, tokens or chips, may be stacked in one or more piles or stacks.

Verification, inventorying or accounting may include determining whether any objects are present, determining a total number of distinct objects in a stack, determining a value of each object that is present and/or determining a cumulative value of the objects. Such is often performed by hand or by eye, with an individual manually counting the objects, visually assessing a value of each object, if any, and mentally assessing a cumulative value of the objects.

Recently, some machine-vision based systems have been proposed to automate the verification, inventorying or accounting functions. Many of the proposed machine-vision based systems have not been commercially successful. The lack of commercial success may be attributable to a variety of factors, for example high computational requirements requiring expensive processors and/or long processing times, inaccuracies, etc. New machine-vision based approaches to verifying, inventorying or accounting for stacks of objects are desirable.

BRIEF SUMMARY

A method of computationally processing images of areas which may contain objects may be summarized as including acquiring a pixelated color image of an area as a set of pixilated color image data at least temporarily stored in at least one processor-readable medium; computationally preprocessing by at least one processor the set of pixelated color image data for at least a portion of the area to produce a set of two color contour image data that represents at least the portion of the pixilated color image, wherein a first color of the two color contour image data corresponds to contour pixels and a second color of the two color contour image corresponds to non-contour pixels; computationally processing by the at least one processor the set of two color contour image data to find a location of a bottom of a stack of objects in the set of two color contour image data and to find a location of a top of the stack of objects in the set of two color contour image data, if any objects are in the at least portion of the area, wherein the stack of objects includes at least one object if any objects are in the at least portion of the area; computationally determining by the at least one processor a total number of objects in the stack, if any based at least in part on a knowledge of the location of the bottom of the stack of objects and the location of the top of the stack of objects; computationally processing by the at least one processor a portion of the set of pixelated color image data based on the knowledge of the location of the bottom of the stack of objects and the location of the top of the stack of objects to respectively classify each object in the stack of objects into one of a defined set of color classes; and computationally determining by the at least one processor a cumulative total value of the stack of objects based at least in part on the color class to which each of the objects in the stack of objects is classified. Acquiring a pixelated color image of an area may include capturing a color image by at least one image acquisition device of at least a portion of a gaming table from a position spaced at a non-zero degree and non-perpendicular angle out of a plane of a playing surface of the gaming table.

Computationally preprocessing by at least one processor the set of pixelated color image data for at least a portion of the area to produce a set of two color contour image data may include: comparing a set of pixilated color image data representing a pixelated reference image of the area to the set of two color contour image data, said reference image having no stack of objects; and removing irregularities from the set of two color contour image data around a stack of objects in the two color contour image data based on the comparing.

The removing irregularities from the set of two color contour image data may include: subtracting the set of pixilated color image data representing a pixelated reference image of the area from the set of two color contour image data; and adding back to the set of two color contour image data an element of average background color of the area.

Computationally preprocessing by at least one processor the set of pixelated color image data for at least a portion of the area to produce a set of two color contour image data may include: color balancing a set of pixilated color image data representing a pixelated reference image of the area to have it more closely match the set of two color contour image data, said reference image having no stack of objects; rotating the set of two color contour image data to compensate for camera distortion for one or more stacks of objects that are near edges of the two color contour image data; aligning the set of pixilated color image data representing the pixelated reference image and the set of two color contour image data to account for movement of an image acquisition device used to acquire the pixelated color image; subtracting the set of pixilated color image data representing a pixelated reference image of the area from the set of two color contour image data; and adding back to the set of two color contour image data image data representing an element of average background color of the area; and either before the subtracting or after the subtracting, converting the set of pixilated color image data representing the pixelated reference image of the area and the set of two color contour image data to gray scale if the converting to gray scale had been determined likely to improve accuracy of the determining of the total number of objects in the stack.

Computationally preprocessing by at least one processor the set of pixelated color image data for at least a portion of the area to produce a set of two color contour image data may further include: eliminating extraneous pixels from the set of two color contour image data that are outside the at least portion of the area; and eliminating extraneous pixels that are not part of groups that at least approximately form the shape of a stack object based on a minimum threshold number of pixels.

The eliminating extraneous pixels that are not part of groups may comprise: passing a template shaped as a stack object over the set of two color contour image data; counting a number of contour pixels within an area defined by the template for each location of the template on the set of two color contour image data; and eliminating all pixels outside the area defined by the template at each location if the number of contour pixels within the area defined by the template contains the minimum threshold number of pixels.

The method of method of computationally processing images may further comprise: before computationally determining by the at least one processor a total number of objects in the stack, determining a horizontal center of the stack of objects based on an overall concentration of contour pixels in the set of two color contour image data; and determining an estimated height of individual objects in the stack of objects based on a mean/average height of an individual object of the stack rationalized for a distance between an image acquisition device used to acquire the pixelated color image and an expected location of the stack, said distance adjusted based on the location of the bottom of the stack at the determined horizontal center of the stack relative to the expected location of the stack of objects.

The method of method of computationally processing images may further comprise reclassifying an object into a different color class based on a determination that a color of the object is obscured by a shadow in the pixelated color image.

The reclassifying an object into a different color class may include: determining whether pixels of an object previously classified as black surpass a threshold regarding (HSB) values of the pixels; and reclassifying the object into a different color class if the threshold is surpassed. The method of method of computationally processing images may further comprise re-determining a value of the object based on the reclassification.

Computationally preprocessing by at least one processor the set of pixelated color image data for at least a portion of the area to produce a set of two color contour image data may include: converting at least a portion of the set of the pixelated color image data to a set of gray scale image data; and edge detection filtering the set of gray scale image data to produce a set of contour image data.

Computationally preprocessing by at least one processor the set of pixelated color image data for at least a portion of the area to produce a set of two color contour image data may further include: converting by the at least one processor at least a portion of the set of contour image data to a set of black and white contour image data.

Computationally preprocessing by at least one processor the set of pixelated color image data for at least a portion of the area to produce a set of two color contour image data may further include: eliminating extraneous pixels from the set of two color contour image data. Converting by the at least one processor at least a portion of the set of contour image data to a set of black and white contour image data may include: converting by the at least one processor a set of gray scale contour image data to a set of hue, saturation, and brightness (HSB) contour image data; and converting by the at least one processor the set of HSB contour image data to the set of black and white contour image data.

Computationally preprocessing by at least one processor the set of pixelated color image data for at least a portion of the area to produce a set of two color contour image data may further include: logically segmenting the two color contour image data into a set of target pixel areas, each of the target pixel areas including a set of n by m pixels.

Computationally preprocessing by at least one processor the set of pixelated color image data for at least a portion of the area to produce a set of two color contour image data may further include eliminating extraneous pixels from the set of two color contour image data by: for each target pixel area of the set of target pixel areas, eliminating all contour pixels in the target pixel area from the set of two color contour image data if a total number of the contour pixels in the target pixel area is less that a threshold number of pixels per target pixel area; and for each target pixel area of at least some of the set of target pixel areas, eliminating all contour pixels in the target quadrant from the set of two color contour image data if the target pixel area has less than a nearest neighboring threshold number of nearest neighboring target pixel areas.

Computationally processing by the at least one processor the set of two color contour image data to find a location of a bottom and a top of a stack of objects in the set of two color contour image data may include: applying a sample bounding box at successive intervals to groups of target pixel areas of the set of target pixel areas to find a location of the bottom the stack of objects, each of the groups of target pixel areas including at least some target pixel areas with contour pixels of the set of two color contour image data that are below a determined upper location in the set of two color contour image data; determining a bottom quadrant to be the sample bounding box that includes the group of target pixel areas with the highest number of target pixel areas having contour pixels; determining whether a width of the target pixel areas included in the bottom quadrant fits a face ellipse of an object; determining whether a width of the target pixel areas included bottom quadrant fits a face ellipse of an object; determining that there is no stack present when the width does not fit the face ellipse; and determining a location of the bottom of the bottom quadrant when the width fits the face ellipse.

Computationally processing by the at least one processor the set of two color contour image data to find a location of a bottom and a top of a stack of objects in the set of two color contour image data may include: determining a location of a bottom of the bottom quadrant by traversing downwardly starting at a location offset from the determined upper location until a last one or more target pixel areas found within a left and right boundary of the bottom quadrant.

Computationally processing by the at least one processor the set of two color contour image data to find a location of a bottom and a top of a stack of objects in the set of two color contour image data may include: successively applying a sample bounding box to groups of target pixel areas of the set of target pixel areas at successive intervals from a determined bottom of the stack of objects until a top streak of target pixel areas contained within the sample bounding box is empty.

Computationally processing by the at least one processor the set of two color contour image data to find a location of a bottom and a top of a stack of objects in the set of two color contour image data may include: determining a top bounding box based on the values of the sample bounding box with the sample bounding box positioned such that the top streak of target quadrants contained within the sample bounding box is empty; successively applying the sample bounding box at successive intervals to find a sample quadrant that fits an elliptical pattern; determining a list of coordinates of the target quadrants that intersect a top arc and a bottom arc of an imaginary ellipse the size of the sample bounding box; determining a total number of target quads that overlap the target quadrants of the imaginary ellipse from the sample bounding box; and determining the sample bounding box position with the most number of overlaps as the top quadrants.

Computationally processing by the at least one processor the set of two color contour image data to find a location of a bottom and a top of a stack of objects in the set of two color contour image data may include: determining a total number of objects in the stack by determining a difference in the bottom of the top quadrant and a bottom of a bottom quadrant and a mean/average height of an individual object rationalized for a distance between the image acquisition device and the stack of objects.

Computationally processing by the at least one processor a portion of the set of pixelated color image data based on a knowledge of a location of a bottom of the stack of objects and a location of a top of the stack of objects to respectively classify each object in the stack of objects into one of a defined set of color classes may include: for each of the objects, classifying a number of pixels in a color pixel streak to respective hue, saturation, and brightness (HSB) values that represent the hue, saturation and brightness of the number of pixels, the color pixel streak composed of a subset of the pixels between a top arc and a bottom arc of an ellipse of the object.

Computationally processing by the at least one processor a portion of the set of pixelated color image data based on the knowledge of the location of the bottom of the stack of objects and the location of the top of the stack of objects to respectively classify each object in the stack of objects into one of a defined set of color classes may further include: for each of the objects, classifying the number of pixels in the color pixel streak to respective fundamental colors based on defined relationships between HSB values and a defined set of fundamental colors.

Computationally processing by the at least one processor a portion of the set of pixelated color image data based on the knowledge of the location of the bottom of the stack of objects and the location of the top of the stack of objects to respectively classify each object in the stack of objects into one of a defined set of color classes may further include: for each of the objects, determining whether the classified fundamental colors of the color pixel streak is in a set of color drift colors.

Computationally processing by the at least one processor a portion of the set of pixelated color image data based on the knowledge of the location of the bottom of the stack of objects and the location of the top of the stack of objects to respectively classify each object in the stack of objects into one of a defined set of color classes may further include: for each of the objects, determining whether the classified fundamental colors of the color pixel streak are a defined primary fundamental color and a number of defined secondary fundamental colors.

Computationally processing by the at least one processor a portion of the set of pixelated color image data based on the knowledge of the location of the bottom of the stack of objects and the location of the top of the stack of objects to respectively classify each object in the stack of objects into one of a defined set of color classes may further include: for each of the objects, if the classified fundamental colors of the color pixel streak are not in the set of color drift colors and the classified fundamental colors of the color pixel streak are not one of the defined primary fundamental color or the defined secondary fundamental colors, determining a fundamental color based on a most common color shared by the pixels of the color pixel streak.

Computationally processing by the at least one processor a portion of the set of pixelated color image data based on the knowledge of the location of the bottom of the stack of objects and the location of the top of the stack of objects to respectively classify each object in the stack of objects into one of a defined set of color classes may further include: for each of the objects, determining a value of the object based on a determined fundamental color and a defined set of fundamental color to object value relationships.

Computationally processing by the at least one processor a portion of the set of pixelated color image data based on the knowledge of the location of the bottom of the stack of objects and the location of the top of the stack of objects to respectively classify each object in the stack of objects into one of a defined set of color classes may further include: summing the determined values of each of the objects.

A system may be summarized as including at least one image capturing device configured to acquire a pixelated color image of an area as a set of pixelated color image data; and at least one object evaluation computing system having at least one processor and at least one storage medium that at least temporarily stores a the set of pixelated color image data, the object evaluation computing system configured to: preprocess using the at least one processor the set of pixelated color image data for at least a portion of the area to produce a set of two color contour image data that represents at least the portion of the pixilated color image; process using the at least one processor the set of two color contour image data to find a location of a bottom of a stack of objects in the set of two color contour image data and to find a location of a top of the stack of objects in the set of two color contour image data, if any objects are in the at least portion of the area, wherein the stack of objects includes at least one object if any objects are in the at least portion of the area; determine using the at least one processor a total number of objects in the stack, if any based at least in part on a knowledge of the location of the bottom of the stack of objects and the location of the top of the stack of objects; process using the at least one processor a portion of the set of pixelated color image data based on the knowledge of the location of the bottom of the stack of objects and the location of the top of the stack of objects to respectively classify each object in the stack of objects into one of a defined set of color classes; and determine using the at least one processor a cumulative total value of the stack of objects based at least in part on the color class to which each of the objects in the stack of objects is classified.

The at least one object evaluation computing system may be further configured to preprocess using the at least one processor the set of pixelated color image data by: comparing a set of pixilated color image data representing a pixelated reference image of the area to the set of two color contour image data, said reference image having no stack of objects; and removing irregularities from the set of two color contour image data around a stack of objects in the two color contour image data based on the comparing.

The removing irregularities may comprise: subtracting the set of pixilated color image data representing a pixelated reference image of the area from the set of two color contour image data; and adding back to the set of two color contour image data an element of average background color of the area.

The at least one object evaluation computing system may be further configured to preprocess using the at least one processor the set of pixelated color image data by: color balancing a set of pixilated color image data representing a pixelated reference image of the area to have it more closely match the set of two color contour image data, said reference image having no stack of objects; rotating the set of two color contour image data to compensate for camera distortion for one or more stacks of objects that are near edges of the two color contour image data; aligning the set of pixilated color image data representing the pixelated reference image and the set of two color contour image data to account for movement of an image acquisition device used to acquire the pixelated color image; subtracting the set of pixilated color image data representing a pixelated reference image of the area from the set of two color contour image data; adding back to the set of two color contour image data image data representing an element of average background color of the area; and either before the subtracting or after the subtracting, converting the set of pixilated color image data representing the pixelated reference image of the area and the set of two color contour image data to gray scale if the converting to gray scale had been determined likely to improve accuracy of the determining of the total number of objects in the stack.

The at least one object evaluation computing system may be configured to preprocess using the at least one processor the set of pixelated color image data by: eliminating extraneous pixels from the set of two color contour image data that are outside the at least portion of the area; and eliminating extraneous pixels that are not part of groups that at least approximately form the shape of a stack object based on a minimum threshold number of pixels.

The eliminating extraneous pixels that are not part of groups may comprise: passing a template shaped as a stack object over the set of two color contour image data; counting a number of contour pixels within an area defined by the template for each location of the template on the set of two color contour image data; and eliminating all pixels outside the area defined by the template at each location if the number of contour pixels within the area defined by the template contains the minimum threshold number of pixels.

The at least one object evaluation computing system may be further configured to: before computationally determining using the at least one processor a total number of objects in the stack, determine a horizontal center of the stack of objects based on an overall concentration of contour pixels in the set of two color contour image data; and determine an estimated height of individual objects in the stack of objects based on a mean/average height of an individual object of the stack rationalized for a distance between an image acquisition device used to acquire the pixelated color image and an expected location of the stack, said distance adjusted based on the location of the bottom of the stack at the determined horizontal center of the stack relative to the expected location of the stack of objects.

The at least one object evaluation computing system may be further configured to reclassify an object into a different color class based on a determination that a color of the object is obscured by a shadow in the pixelated color image.

The at least one object evaluation computing system may be configured to reclassify an object by: determining whether pixels of an object previously classified as black surpass a threshold regarding (HSB) values of the pixels; and reclassifying the object into a different color class if the threshold is surpassed. The at least one object evaluation computing system may be further configured to re-determine a value of the object based on the reclassification.

The at least one object evaluation computing system may be further configured to convert at least a portion of the set of the pixelated color image data to a set of gray scale image data and perform edge detection filtering of the set of gray scale image data to produce a set of contour image data.

The at least one object evaluation computing system may be further configured to logically segment the two color contour image data into a set of target pixel areas, each of the target pixel areas including a set of n by m pixels.

The at least one object evaluation computing system may be further configured to eliminate extraneous pixels from the set of two color contour image data by: for each target pixel area of the set of target pixel areas, eliminating all contour pixels in the target pixel area from the set of two color contour image data if a total number of the contour pixels in the target pixel area is less that a threshold number of pixels per target pixel area; and for each target pixel area of at least some of the set of target pixel areas, eliminating all contour pixels in the target quadrant from the set of two color contour image data if the target pixel area has less than a nearest neighboring threshold number of nearest neighboring target pixel areas.

The at least one object evaluation computing system may be further configured to: apply a sample bounding box at successive intervals to groups of target pixel areas of the set of target pixel areas to find a location of the bottom the stack of objects, each of the groups of target pixel areas including at least some target pixel areas with contour pixels of the set of two color contour image data that are below a determined upper location in the set of two color contour image data; determine a bottom quadrant to be the sample bounding box that includes the group of target pixel areas with the highest number of target pixel areas having contour pixels; determine whether a width of the target pixel areas included in the bottom quadrant fits a face ellipse of an object; determine whether a width of the target pixel areas included bottom quadrant fits a face ellipse of an object; determine that there is no stack present when the width does not fit the face ellipse; and determine a location of the bottom of the bottom quadrant when the width fits the face ellipse.

The at least one object evaluation computing system may be further configured to: successively apply a sample bounding box to groups of target pixel areas of the set of target pixel areas at successive intervals from a determined bottom of the stack of objects until a top streak of target pixel areas contained within the sample bounding box is empty.

The at least one object evaluation computing system may be further configured to: determine a top bounding box based on the values of the sample bounding box with the sample bounding box positioned such that the top streak of target quadrants contained within the sample bounding box is empty; successively apply the sample bounding box at successive intervals to find a sample quadrant that fits an elliptical pattern; determine a list of coordinates of the target quadrants that intersect a top arc and a bottom arc of an imaginary ellipse the size of the sample bounding box; determine a total number of target quads that overlap the target quadrants of the imaginary ellipse from the sample bounding box; and determine the sample bounding box position with the most number of overlaps as the top quadrants.

The at least one object evaluation computing system may be further configured to: determine a total number of objects in the stack by determining a difference in the bottom of the top quadrant and a bottom of a bottom quadrant and a mean/average height of an individual object rationalized for a distance between the image acquisition device and the stack of objects.

The at least one object evaluation computing system may be further configured to: classify for each of the objects a number of pixels in a color pixel streak to respective hue, saturation, and brightness (HSB) values that represent the hue, saturation and brightness of the number of pixels, the color pixel streak composed of a subset of the pixels between a top arc and a bottom arc of an ellipse of the object.

The at least one object evaluation computing system may be further configured to: classify for each of the objects the number of pixels in the color pixel streak to respective fundamental colors based on defined relationships between HSB values and a defined set of fundamental colors.

The at least one object evaluation computing system may be further configured to: determine for each of the objects whether the classified fundamental colors of the color pixel streak are in a set of color drift colors.

The at least one object evaluation computing system may be further configured to: determine for each of the objects a value of the object based on a determined fundamental color and a defined set of fundamental color to object value relationships.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems, networks, and image acquisition have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, such as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise. The headings and Abstract of the Disclosure provided herein are for convenience only and do not interpret the scope or meaning of the embodiments.

Figure 1:
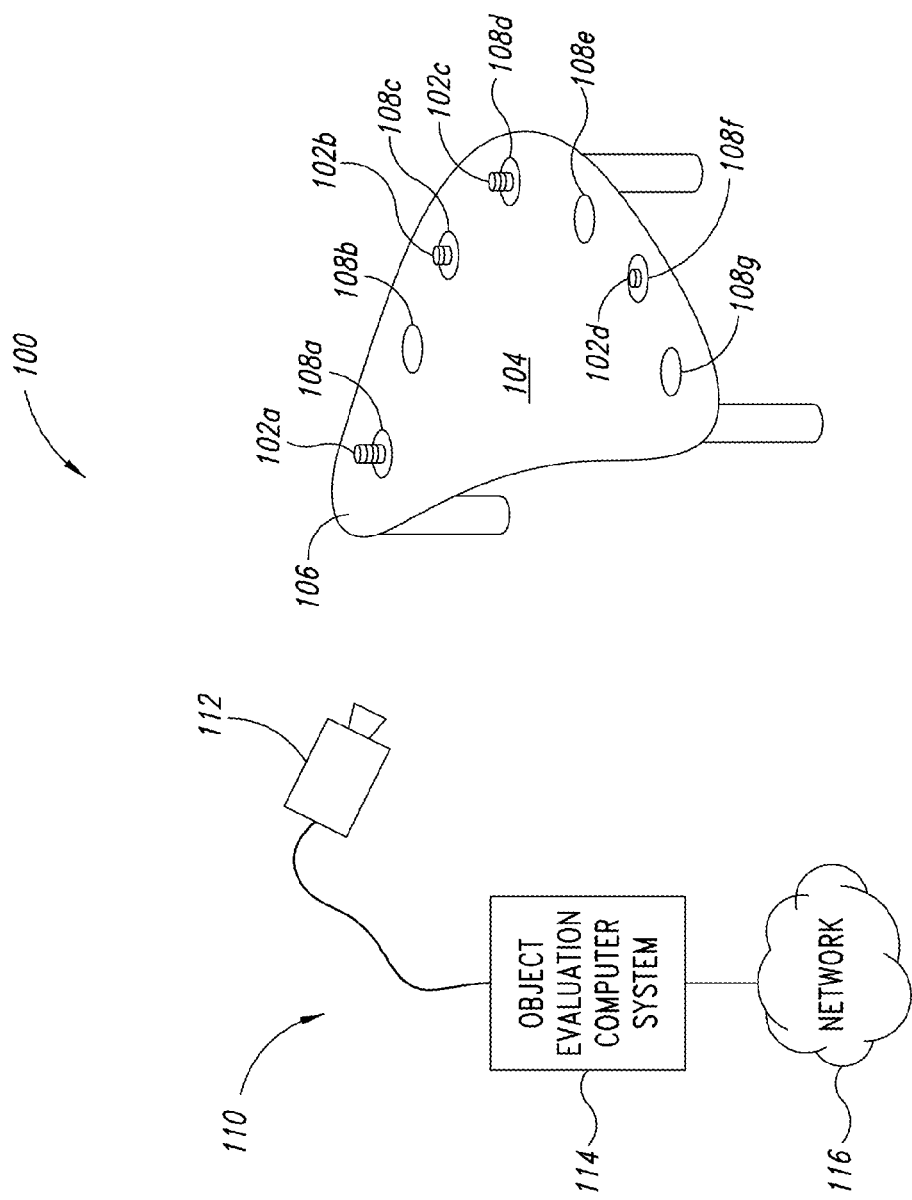
FIG. 1 is a schematic diagram of an environment including an object evaluation system and a surface on which a number of objects are stacked, according to one illustrated embodiment.

FIG. 1 shows an environment 100, according to one illustrated embodiment, in which stacks of objects may be evaluated by an object evaluation system.

In particular, stacks of objects 102 (e.g., 102a-102d) are arranged on a surface 104, for example a surface of a table 106. The surface 104 may include demarcated areas 108a-108g (collectively 108) in which stacks of objects may be placed from time to time. The stacks of objects 102 may include one or more objects that are generally arranged one on top of the other, such as in a uniform stack where the outside edges (i.e., perimeters) of the objects align, or in an irregular stack where object perimeters are unaligned. In this illustrated example, the stacks of objects 102a, 102b, 102c, and 102d are respectively located in demarcated areas 108a, 108c, 108d, and 108f.

Each of the objects has an associated value and/or worth that is visually represented by the object's coloration. In some embodiments, the coloration of an object may be monochromatic, multicolored, and/or may include markings of various shapes and/or patterns (e.g., on a face of the object, on an outside perimeter of the object). In various embodiments, the objects may include tokens, chips, coins, etc.

The environment 100 may be subject to fluctuating lighting conditions. For example, the lighting in the environment may vary due to a time of day, artificial lighting, light emanating or reflecting from various sources within the environment (e.g., televisions, illuminated advertisements, devices, etc.), shadows cast by objects and/or people in the environment 100, etc. The lighting conditions may vary in luminance (e.g., brightness, darkness) and/or color. Due to such lighting variations, an object's coloration may be subject to "color drift," in which a color of an object may appear different under different lighting conditions. For example, a blue colored object may appear black under darker light conditions, light blue under brighter light conditions, or purple under a reddish light; a white object may appear yellowish under some lighting conditions.

The environment 100 also includes an object evaluation system 110, which includes an image acquisition device 112 and an object evaluation computer system 114. The image acquisition device 112 may be any of a variety of image acquisition devices, such as including cameras, for instance digital still cameras, video cameras, CMOS image sensors, and/or any other type of device for acquiring or capturing color images (including devices incorporating or paired with a frame grabber or the like). The object evaluation computer system 114 may be a computing system or device that includes hardware, software, firmware, or some combination thereof configured to perform appropriate portions of object evaluation, such as shown and described in FIGS. 3A-3B, 4A-4B, and 5-16. Although the image acquisition device 112 is shown in FIG. 1 as being attached to the object evaluation computer system 114, it will be appreciated that in other embodiments, the image acquisition device 112 may be communicatively coupled to the object evaluation computer system 114 in various other ways, such as via the network 116.

The image capture device 112 is positioned at a non-zero degree and non-perpendicular angle out of a plane of the surface 104 to acquire or capture an image of at least a portion of the surface 104 that includes one or more of the demarcated areas 108. For example, in some embodiments, the image acquisition device 112 is positioned at an elevated height above the surface 104 of the table 106 and oriented to acquire or capture images of demarcated areas 108, such that stacks of one or more objects present within the demarcated areas appear in the image with at least a portion of a top surface of the stack and a side surface of the stack are both visible in the image, such as shown and described with respect to FIGS. 3A-3B. In some embodiments, the image acquisition device 112 may be positioned below the surface 104 and oriented to acquire or capture images of one or more demarcated areas 108 from below the surface 104, such as where the surface 104 is transparent or translucent to at least some wavelengths of light.

In one embodiment, the image acquisition device 112 is positioned and oriented to acquire or capture in a single image all the demarcated areas 108 present on the surface 104 of the table 106. Positioning and orienting the image acquisition device may also include configuring the image acquisition device 112 in various ways, such as specifying and/or determining a camera zoom (optical, digital), an image point (focus), an aperture setting, etc.

In various embodiments, the image acquisition device 112 may be affixed to the table 106, and/or incorporated into a device, article, or structure (none of which are shown) that is affixed to placed on, or otherwise carried by the table 106. In some embodiments, the camera may be remotely located from the table 106, such as being attached to a structure other than the table 106, a ceiling, held/worn by a human, placed underneath the table 106, etc. Furthermore, the object evaluation computer system 114 may be included in a device, article, or structure that may be affixed to or placed on the table 106. In other embodiments, the object evaluation computer system 114 may be under the table 106, or may be remotely located from the table 106. In some embodiments, the object evaluation computer system 114 and the image acquisition device 112 may be integrated into a single system, device, or casing.

As described in more detail herein, the object evaluation computer system 114 of the object evaluation system 110 may execute instructions stored on a computer readable medium (not shown in FIG. 1) so as to automatically determine a value associated with a stack of one or more objects 102 present in a demarcated area 108. In particular, the object evaluation system 110 may execute instructions to cause the image acquisition device 112 to acquire a pixelated color image including one or more of the demarcated areas 108, and process one or more sections of the acquired image respectively corresponding to the one or more demarcated areas 108, so as to evaluate objects that are stacked in the one or more demarcated areas 108, if any. Such processing of an image section of the pixelated color image corresponding to a demarcated area may include preprocessing the image section as a gray scale image to identify contour data, processing the contour data to determine a location of a top and a bottom of a stack of objects 102 located within a respective demarcated area 108, identifying a respective set of color pixels associated with each of the objects in the stack from the pixelated color image based on the located top and bottom of the stack, determining a corresponding value for each of the objects in the stack based on a color classification of the respective sets of color pixels, and determining a cumulative value of the stack of objects. As part of the color classification, the object evaluation computer system 114 may account for color drift that may occur in the image, so as to determine an appropriate color classification for an object notwithstanding fluctuating lighting conditions in the environment 100. Thus, in at least one embodiment, the object evaluation computer system 114 may execute instructions that cause the object evaluation computer system 114 to determine the value associated with stacks of objects 102 present in any one of the demarcated areas 108 of the environment 100 under various lighting conditions.

The object evaluation computer system 114 may be communicatively coupled to a communications network 116, such as to communicate with one or more other computing systems and/or devices (not shown). For example, in some embodiments, the object evaluation computer system may provide information related to determined stack values to one or more computing systems, such as a centralized server computer, to facilitate monitoring of the environment 100. In other embodiments, the object evaluation computer system 114 and the image acquisition device 112 may be communicatively coupled via the network 116. The network 116 may take a variety of forms. For instance, the networks 116 may include wired, wireless, optical, or a combination of wired, wireless and/or optical communications links. In addition, the network 108 may include public networks, private networks, unsecured networks, secured networks or combinations thereof, and may employ any one or more communications protocols, for example TCP/IP protocol, UDP protocols, IEEE 802.11 protocol, as well as other telecommunications or computer networking protocols.

Although only a single object evaluation system 110 is shown in the illustrated embodiment of FIG. 1, in other embodiments multiple object evaluation systems 110 may be provided, such that each system determines a value of stacks of objects 102 corresponding to a different one or more of the demarcated areas 108 and/or corresponding to demarcated areas corresponding to one or more other tables (not shown). Further, multiple image acquisition devices 112 may also be provided, such as for acquiring or capturing images of various of the demarcated areas 108 of the surface 104, or for acquiring or capturing images of demarcated areas associated with different tables, with a single object evaluation computer system 114 processing images acquired or captured via multiple image acquisition devices.

The described systems and techniques may be used in a variety of contexts. For example, in some embodiments, the described systems and techniques may be used for monitoring various types of transactions involving coins, tokens, and/or chips.

In at least one exemplary embodiment of the environment 100, the objects that are stacked are gambling chips that are wagered by players of wagering games, such as games including, but not limited to, poker, blackjack, baccarat, roulette, wheel of fortune, etc. For example, such an environment may include a casino, a gaming parlor, and/or any other location in which wagering games are played. Each gambling chip represents a particular monetary denomination that may be wagered by a player, with each chip having a distinct coloration indicative of a respective monetary amount. For example, the following color and denomination relationships may be typical in some embodiments: white representing $1, red representing $5, green representing $25, black representing $100, purple representing $500, and yellow representing $1000. In various embodiments, the coloration of a chip may be a single color, multiple colors, and/or color patterns appearing on the chip.

In such an embodiment of the environment 100, the stacks of objects 102 are bet stacks (e.g., stacks of one or more gambling chips), the table 106 is a gaming table with playing surface 104, and the demarcated areas 108 are betting circles. During a wagering game, the players place respective bets by selecting a number of chips to wager and placing the selected chips in a respective betting circle of the gaming table. The number of chips stacked in a betting circle constitutes a bet stack for the respective player. Further, the number and denomination of the chips in the bet stack represents a cumulative monetary amount that the player wagers at a given time.

In such an embodiment, the object evaluation system 110 may be used to capture and process one or more images of the surface of the gaming table to evaluate bet stacks and determine monetary amounts that one or more players are wagering. Such a system may be useful for a casino or other provider of the wagering game to monitor betting patterns of one or more players, such as for the purposes of fraud detection (e.g., detecting patterns consistent with card counting, etc.), to perform general tracking and/or accounting, etc.

The detailed structure and operation of the object evaluation system are discussed in more detail below.

Figure 2:
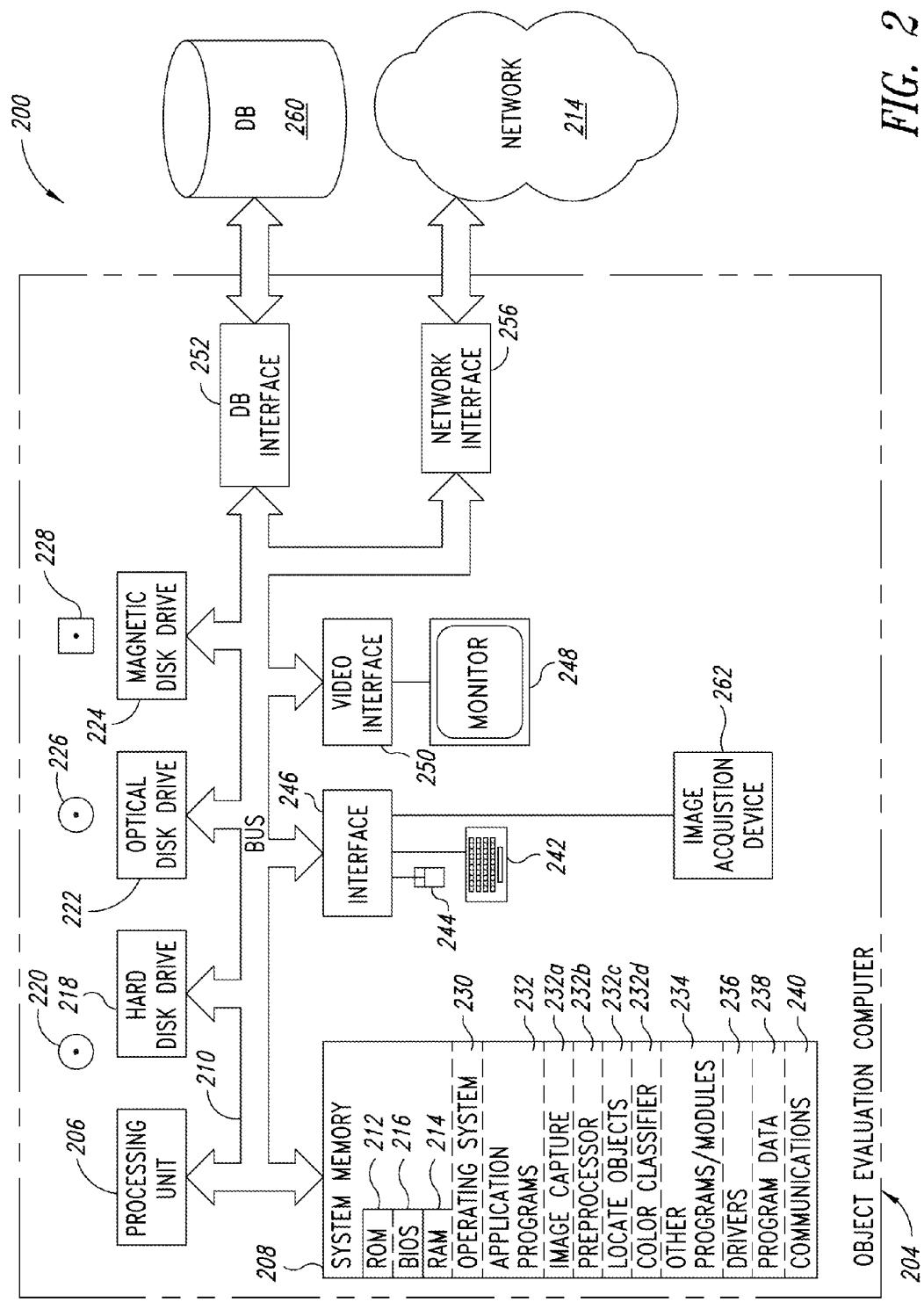
FIG. 2 is a schematic diagram of an object evaluation computing system, according to one illustrated embodiment.

FIG. 2 and the following discussion provide a brief, general description of an exemplary object evaluation computing system 200 in which the various illustrated embodiments can be implemented. The object evaluation computing system 200 may, for example, implement the various functions and operations discussed immediately above in reference to FIG. 1.

Although not required, some portion of the embodiments will be described in the general context of computer-executable instructions or logic, such as program application modules, objects, or macros being executed by a computer. Those skilled in the relevant art will appreciate that the illustrated embodiments as well as other embodiments can be practiced with other computer system configurations, including handheld devices for instance Web enabled cellular phones or PDAs, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The object evaluation computing system 200 may include one or more object evaluation computers 204 (only one illustrated in FIG. 2). The object evaluation computer(s) 204 may take the form of a conventional PC, server, or other computing system executing instructions. The object evaluation computer 204 includes a processing unit 206, a system memory 208 and a system bus 210 that couples various system components including the system memory 208 to the processing unit 206. The object evaluation computer 204 will at times be referred to in the singular herein, but this is not intended to limit the embodiments to a single system, since in certain embodiments, there will be more than one system or other networked computing device involved. Non-limiting examples of commercially available systems include, but are not limited to, an 80x86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 206 may be any logic processing unit, such as one or more central processing units (CPUs), microprocessors, digital signal processors (DSPs), application-specific integrated circuits (ASICs), field programmable gate arrays (FPGAs), etc. Unless described otherwise, the construction and operation of the various blocks shown in FIG. 2 are of conventional design. As a result, such blocks need not be described in further detail herein, as they will be understood by those skilled in the relevant art.

The system bus 210 can employ any known bus structures or architectures, including a memory bus with memory controller, a peripheral bus, and a local bus. The system memory 208 includes read-only memory ("ROM") 212 and random access memory ("RAM") 214. A basic input/output system ("BIOS") 216, which can form part of the ROM 212, contains basic routines that help transfer information between elements within the object evaluation computer 204, such as during start-up. Some embodiments may employ separate buses for data, instructions and power.

The object evaluation computer 204 also includes a hard disk drive 218 for reading from and writing to a hard disk 220, and an optical disk drive 222 and a magnetic disk drive 224 for reading from and writing to removable optical disks 226 and magnetic disks 228, respectively. The optical disk 226 can be a CD or a DVD, while the magnetic disk 228 can be a magnetic floppy disk or diskette. The hard disk drive 218, optical disk drive 222 and magnetic disk drive 224 communicate with the processing unit 206 via the system bus 210. The hard disk drive 218, optical disk drive 222 and magnetic disk drive 224 may include interfaces or controllers (not shown) coupled between such drives and the system bus 210, as is known by those skilled in the relevant art. The drives 218, 222, 224, and their associated computer-readable media 220, 226, 228, provide nonvolatile storage of computer-readable instructions, data structures, program modules and other data for the object evaluation computer 204. Those skilled in the relevant art will appreciate that other types of computer-readable media may be employed to store data accessible by a computer, such as magnetic cassettes, flash memory cards, Bernoulli cartridges, RAMs, ROMs, smart cards, etc.

Program modules can be stored in the system memory 208, such as an operating system 230, one or more application programs 232, other programs or modules 234, drivers 236 and program data 238.

The application programs 232 may, for example, include image acquisition logic 232a, image preprocessing logic 232b, locate object logic 232c, and color classification logic 232d. The logic 232a-232d may, for example, be stored as one or more executable instructions.

As discussed in more detail below, the image acquisition logic 232a may include logic or instructions to acquire one or more digital color images of a surface having one or more stacks of objects thereon, such as a surface 104 of the table 106 (FIG. 1), via the image acquisition device 262. Such digital color images may be stored at least temporarily in system memory 208 or another computer readable medium for processing as described below. The image acquisition logic 232a may also identify or otherwise isolate a section of an acquired or captured image that corresponds to a particular demarcated area that may contain a stack of objects, such as a demarcated area 108. As discussed in more detail below, the image preprocessing logic 232b may include logic or instructions to generate two-color contour data from a section of the acquired or captured digital color image, such that the two-color contour data may be further processed to evaluate a stack of one or more objects that may be present in the acquired or captured image. Such preprocessing may include subdividing the two-color contour data into a set of target pixel areas associated with the image section. As discussed in more detail below, the locate object logic 232c may include logic or instructions to process a set of target pixel areas associated with the image section to identify various features of a stack of objects, such as to identify a top and a bottom of the stack, and a number of objects present in the stack. Additionally, as discussed in more detail below, the color classifier logic 232d may include logic or instructions to identify a set of color pixels associated with each of the one or more objects in the stack, automatically determine a color classification for each of the objects, and determine a cumulative value for the stack based on the color classifications of each object. The relationship between an object's color classification and a value may be based on a known/configured relationship between colors and associated values. Furthermore, the color classification logic may compensate for various lighting conditions in the environment 100, so as to allow objects imaged in the acquired digital color image to be appropriately classified even in an environment with fluctuating lighting conditions in which color drift may occur. Such application programs 232 may execute the logic 232a-232d as methods or processes set out in the various flow charts discussed below.

The system memory 208 may also include other programs/modules 234, such as including logic for calibrating and/or otherwise training various aspects of an object evaluation system 200, such as logic that may be used to configure the location of demarcated areas within images, the expected size of objects imaged within demarcated areas, color/value relationship, etc. The other programs/modules 234 may include various other logic for performing various other operations and/or tasks.

The system memory 208 may also include communications programs 240 that permit the object evaluation computer 204 to access and exchange data with other systems or components, such as with the image acquisition device 262 and/or optionally with one or more other computer systems and devices (not shown).

While shown in FIG. 2 as being stored in the system memory 208, the operating system 230, application programs 232, other programs/modules 234, drivers 236, program data 238 and communications 240 can be stored on the hard disk 220 of the hard disk drive 218, the optical disk 226 of the optical disk drive 222 and/or the magnetic disk 228 of the magnetic disk drive 224.

A user can enter commands and information into the object evaluation computer 204 through input devices such as a touch screen or keyboard 242, a pointing device such as a mouse 244, a push button (not shown), and/or foot-control (not shown). Other input devices can include a microphone, joystick, game pad, tablet, scanner, biometric scanning device, etc. These and other input devices are connected to the processing unit 206 through an interface 246 such as a universal serial bus ("USB") interface that couples to the system bus 210, although other interfaces such as a parallel port, a game port or a wireless interface or a serial port may be used. A monitor 248 or other display device is coupled to the system bus 210 via a video interface 250, such as a video adapter.

The image acquisition device 262 may be a video camera, digital still camera, or other imaging device. In some embodiments, the image acquisition device may include a frame grabber or other device for capturing, buffering, converting, and/or otherwise obtaining digital color images for processing by the object evaluation computer 204. In this illustrated embodiment, the image acquisition device 262 is shown as being connected to interface 246, although in other embodiments, the image acquisition device 262 may be connected to the object evaluation computer 204 using other means, such as via the network 214, via one or more intermediary devices (not shown), etc.

Furthermore, although not illustrated here, the object evaluation computer 204 may include a triggering device and/or other mechanism for manually triggering the object evaluation computer 204 to acquire or capture an image via the image acquisition device 262, such as a push button, a foot control, etc. In some embodiments, the triggering device and/or other mechanism may be attached to or otherwise coupled to the image acquisition device 262. Further, image acquisition may be automatically triggered by the object evaluation computer 204, such as based on a timer and/or an occurrence of another event, and/or may be remotely triggered via the network 214.

In some embodiments, the object evaluation computer 204 operates in an environment 100 (FIG. 1) using one or more of the logical connections to optionally communicate with one or more remote computers, servers and/or other devices via one or more communications channels, for example, one or more networks such as the network 214. These logical connections may facilitate any known method of permitting computers to communicate, such as through one or more LANs and/or WANs. Such networking environments are well known in wired and wireless enterprise-wide computer networks, intranets, extranets, and the Internet. For example, in some embodiments, the object evaluation computer 204 may communicate with one or more additional image acquisition devices (not shown) via the network 214, such as for the purposes of acquiring or capturing images of other surfaces and/or object stacks for processing by the object evaluation computer 204. In some further environments, the object evaluation computer 204 may communicate with one more other computing systems or device, such as to receive indications to acquire or capture and/or evaluate images, and/or to provide information regarding evaluated images, such as information regarding the determined value of objects, etc.

In some embodiments, the network interface 256, which is communicatively linked to the system bus 210, may be used for establishing communications over the network 214. Further, the database interface 252, which is communicatively linked to the system bus 210, may be used for establishing communications with a database stored on one or more computer-readable media 260. For example, such a database 260 may include a repository for storing information regarding object evaluation, color tables, object color-value relationship information, etc. In some embodiments, the database interface 252 may communicate with the database 260 via the network 214.

In an environment 100 (FIG. 1), program modules, application programs, or data, or portions thereof, can be stored in another server computing system (not shown). Those skilled in the relevant art will recognize that the network connections shown in FIG. 2 are only some examples of ways of establishing communications between computers, and other connections may be used, including wirelessly. In some embodiments, program modules, application programs, or data, or portions thereof, can even be stored in other computer systems or other devices (not shown).

For convenience, the processing unit 206, system memory 208, network port 256 and interfaces 246, 252 are illustrated as communicatively coupled to each other via the system bus 210, thereby providing connectivity between the above-described components. In alternative embodiments of the object evaluation computer 204, the above-described components may be communicatively coupled in a different manner than illustrated in FIG. 2. For example, one or more of the above-described components may be directly coupled to other components, or may be coupled to each other, via intermediary components (not shown). In some embodiments, system bus 210 is omitted and the components are coupled directly to each other using suitable connections.

In many of the embodiments presented below, the objects that comprise a stack are illustrated and described as having a cylindrical shape with a circular periphery or peripheral edge, and in particular, the objects are chips. Furthermore, the demarcated areas in which the objects are stacked are illustrated and described as having a circular shape. It will be appreciated that in other embodiments, the objects and/or the demarcated areas may have different corresponding shapes.

Figure 3A:
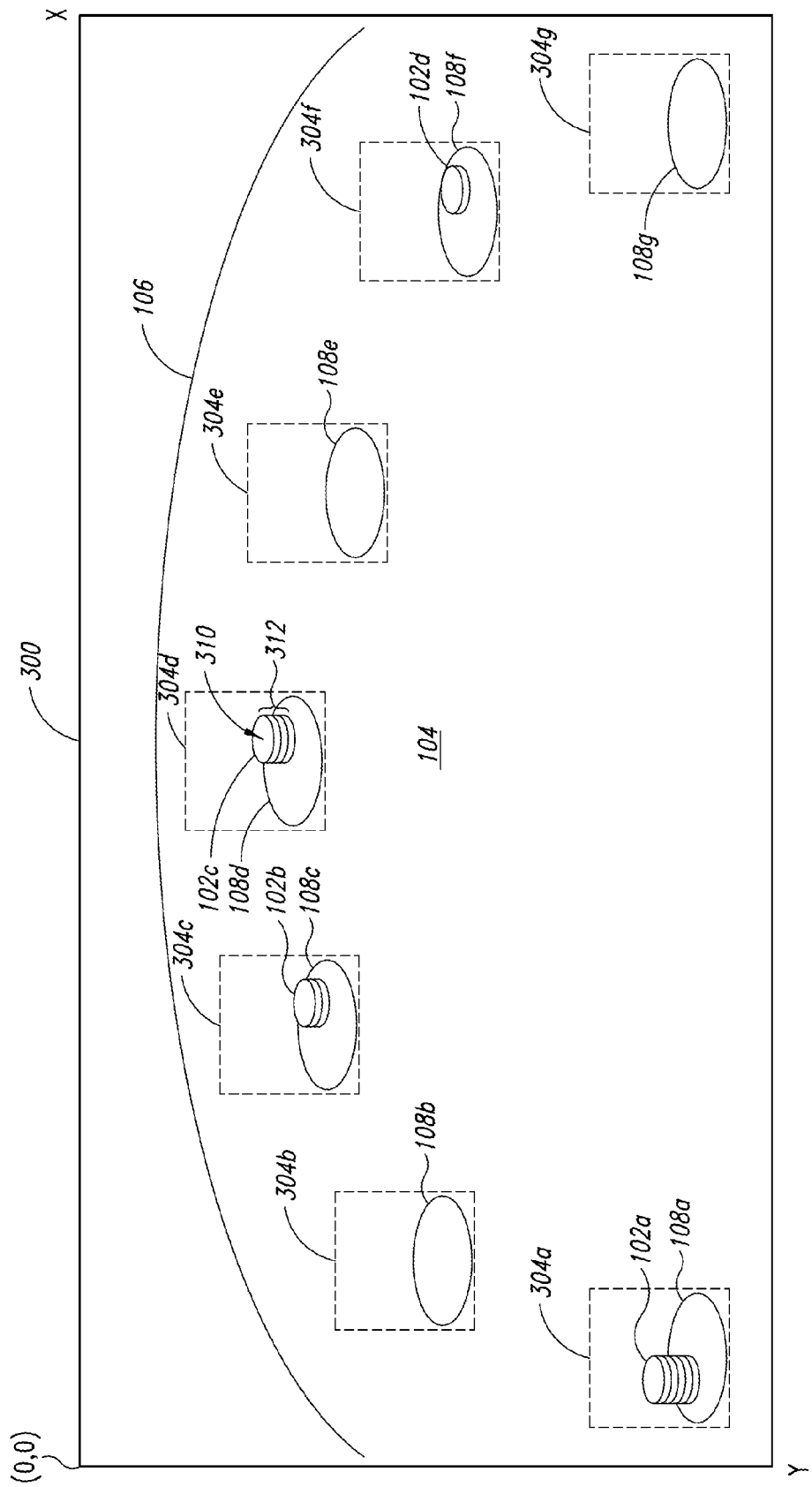
FIG. 3A is a representation of a digital image of a number of demarcated areas and object stacks, according to one illustrated embodiment.
Figure 3B:
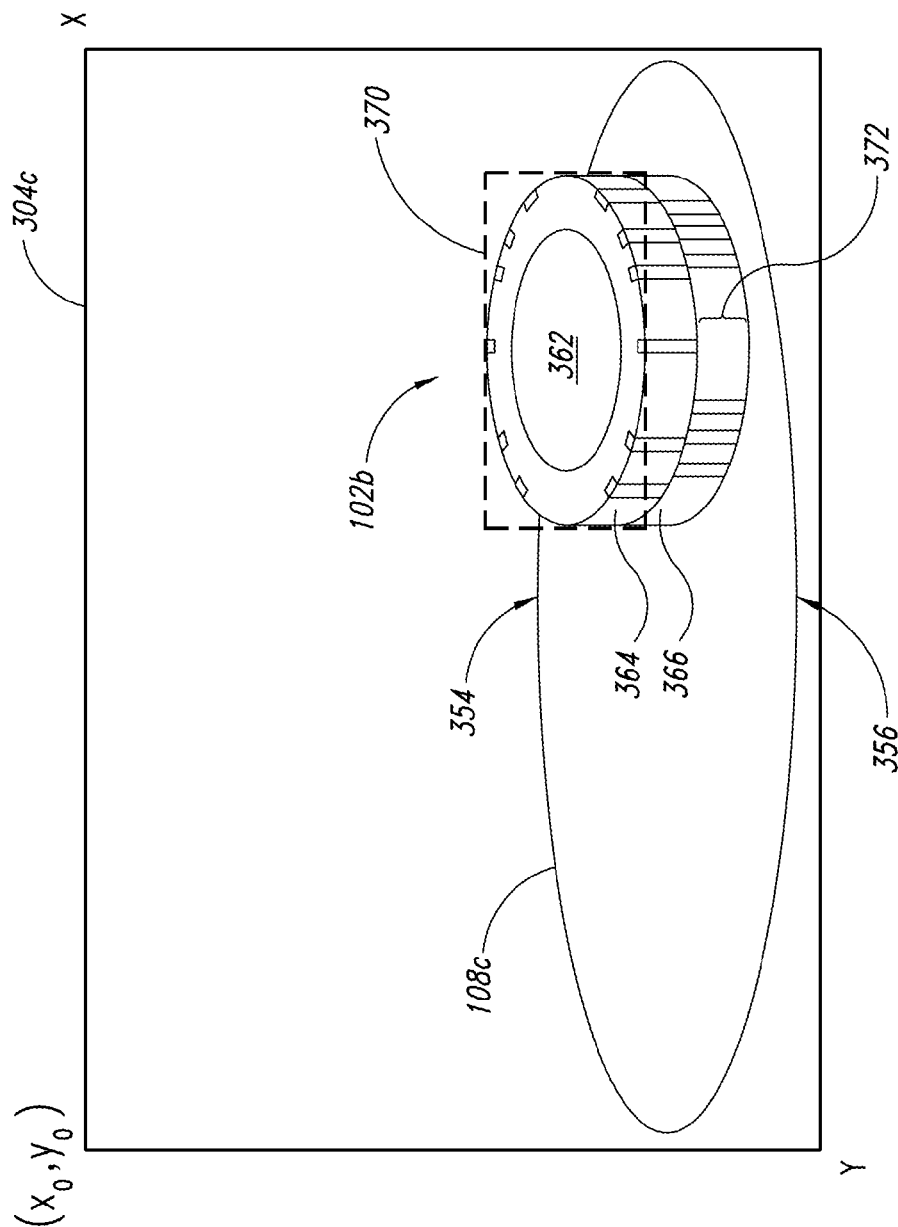
FIG. 3B is a representation of an image section of the digital image of FIG. 3A, according to one illustrated embodiment.

FIG. 3A is a representation of a pixelated image 300. FIG. 3B shows an image section 304c of the pixelated image 300. FIGS. 3A-3B provide context for description of embodiments of an object evaluation routine described with respect to FIGS. 5-16. Although FIGS. 3A-3B are not illustrated in color, it will be appreciated that the pixelated image 300 is representative of a digital color image that comprises of pixel data having color components (e.g., red, green, blue), with various of the objects appearing in the image 300 having corresponding color information that is represented in the pixel data of image 300.

FIG. 3A is a representation of a pixelated color image 300 of the surface 104, including demarcated areas 108 and object stacks 102, according to one illustrated embodiment. The image 300 may be acquired or captured by the image acquisition device 112 (FIG. 1), such as for processing by the object evaluation computing system 114 (FIG. 1) to evaluate one or more stacks of objects presented in the image. In this example of the pixelated image 300, each of the stacks of objects 102 is located within a respective demarcated area 108, with stack 102a having five objects, stack 102b having two objects, stack 102c having three objects, and stack 102d having one object, although other stack sizes are possible and anticipated. Although this illustrated embodiment shows seven demarcated areas 108, other embodiments may include more or less demarcated areas.

As is shown in FIG. 3A, the image 300 has been acquired or captured by an image acquisition device 112 from such a position and orientation that each of the imaged stacks of objects 102 has a top surface and a portion of a perimeter of the stack showing. For example, with respect to the stack of objects 102c, a top surface 310 and the side perimeter 312 of the stack 102c are visible in the image. In at least one embodiment, where the objects are cylindrical (e.g., chips), the top surface of the stack appears in the image as an ellipse, such as illustrated here. In addition, in this illustrated embodiment, the demarcated areas 108 are circular, and thus also appear as ellipses in the images.

Various image sections 304a-304g (collectively 304) of the image 300 are shown in FIG. 3A. Each of the image sections 304 corresponds to a particular demarcated area 108, and in particular, defines a section of the image 300 (e.g., a group of pixels) that is to be processed for object evaluation in the corresponding demarcated area. For example, the image area 304a defines a section of the image 300 that is to be processed for evaluating a stack of one or more objects present (if any) in the demarcated area 108a. Image sections 304b-304g respectively correspond to demarcated areas 108b-108g. Each of the image sections 304 includes an area of the image 300 that substantially encompasses a respective demarcated area 108 and a stack of one or more objects 102 that may be present in the respective demarcated area. In some embodiments, the image sections 304 may be defined by a user during a manual configuration process.

In various embodiments, the image 300 may be comprised of various amounts of digital image data (e.g., pixel data). As one example, the image 300 may correspond to a 3.1 megapixel image, which is approximately comprised of 2048× 1536 pixels, although other image sizes may be used (e.g., 2 megapixel, 8 megapixel, 10 megapixel, etc.). As is typical in digital image processing, the upper-left corner of the image 300 is illustrated as corresponding to the origin of the image (pixel position X=0, Y=0), with the X-axis being the horizontal axis and increasing towards the right of the illustrated digital image 300, and the Y-axis being the vertical axis and increasing towards the bottom of the illustrated digital image 300.

Further, each of the image sections 304 may correspond to a particular subset of the image pixels of the image 300, and may be defined based on pixel coordinates corresponding to the particular subsets. For example, in this illustrated embodiment, each of the image sections may be defined as having an origin pixel (e.g., the upper-left corner) corresponding to pixel coordinates of the image 300, and a specified height and width.

Of course, it will be appreciated that other embodiments are possible. For example, the image 300 may have more or less image data, and/or other coordinate systems may be used. Furthermore, the sizes and shapes of the image sections 304 may vary in different embodiments, and even from one image section to another image section. In addition, in some embodiments, prior to processing an image section 304 for evaluation by the object evaluation system, the image section 304 may be cropped from the image 300 and interpolated into an image having larger dimensions (e.g., a larger number of pixels), such as by digitally zooming the image section 304.

FIG. 3B shows a representation of the image section 304c of the image 300 (FIG. 3A). The upper-left corner of the image section 304c corresponds to pixel position $(x_0, y_0)$ from the image 300, which corresponds to the pixel position of the upper-left corner of the image section 304c illustrated in FIG. 3A. In particular, in FIG. 3B the image section 304c includes the object stack 102b present in the demarcated area 108c. The top and bottom of the demarcated area are indicated respectively as 354 and 356. In this illustrated example, the object stack 102b includes two objects, with a chip 364 being at the top of the stack 102b, and a chip 366 being at the bottom of the stack 102b. A top surface 362 (also referred to herein as a "face," an "object face," or a "chip face") of the top chip 364 is visible, as well as a portion of a perimeter of the top chip 364 and a portion of a perimeter of the bottom chip 366. In this embodiment, when the stack 102b is positioned within the demarcated area 108c, the bottom object 366 of the stack 102b will appear in the image section 304c as being substantially within the demarcated area 108c.

A bounding box 370 is illustrated in FIG. 3B. The bounding box 370 is representative of the size of an object face as it may appear in the image section 304c. In particular, the bounding box 370 is a rectangle that closely encompasses the elliptical object face as it may appear in image section 304c, with the height and width of the rectangle respectively defined by the vertical height (in pixels) and the horizontal width (in pixels) of the elliptical object face. As described in more detail elsewhere, the bounding box may be used by the object evaluation system as part of locating objects and/or identify various features of objects and/or object stacks.

In some embodiments, the bounding box 370 may be defined based on an image of a representative object (e.g., a chip) as it appears when placed within the demarcated area 108c, such that the object is completely encompassed within the demarcated area 108c when imaged. For example, in some embodiments, the bounding box may be predefined during a calibration process, in which a user places a representative object within the demarcated area 108c, the object is imaged, and the bounding box is determined based on the resulting image (e.g., automatically and/or manually).

Indication 372 shows a height of a single object (e.g., the height of the bottom object 366) as it appears in the image section 304c. The height of the object as it appears in the image section may be predefined, such as based on a single object as it appears in the image section when the object positioned within the demarcated area (e.g., such as during a calibration/training process). In some embodiments, the height of the object may be a determined mean/average height of objects as they appear within in the image section.

Although FIGS. 3A-3B and 4A-4B are depicted as having aligned object stacks, it will be appreciated that the techniques described herein are applicable in cases where object stacks are skewed or otherwise irregularly stacked.

Figure 4A:
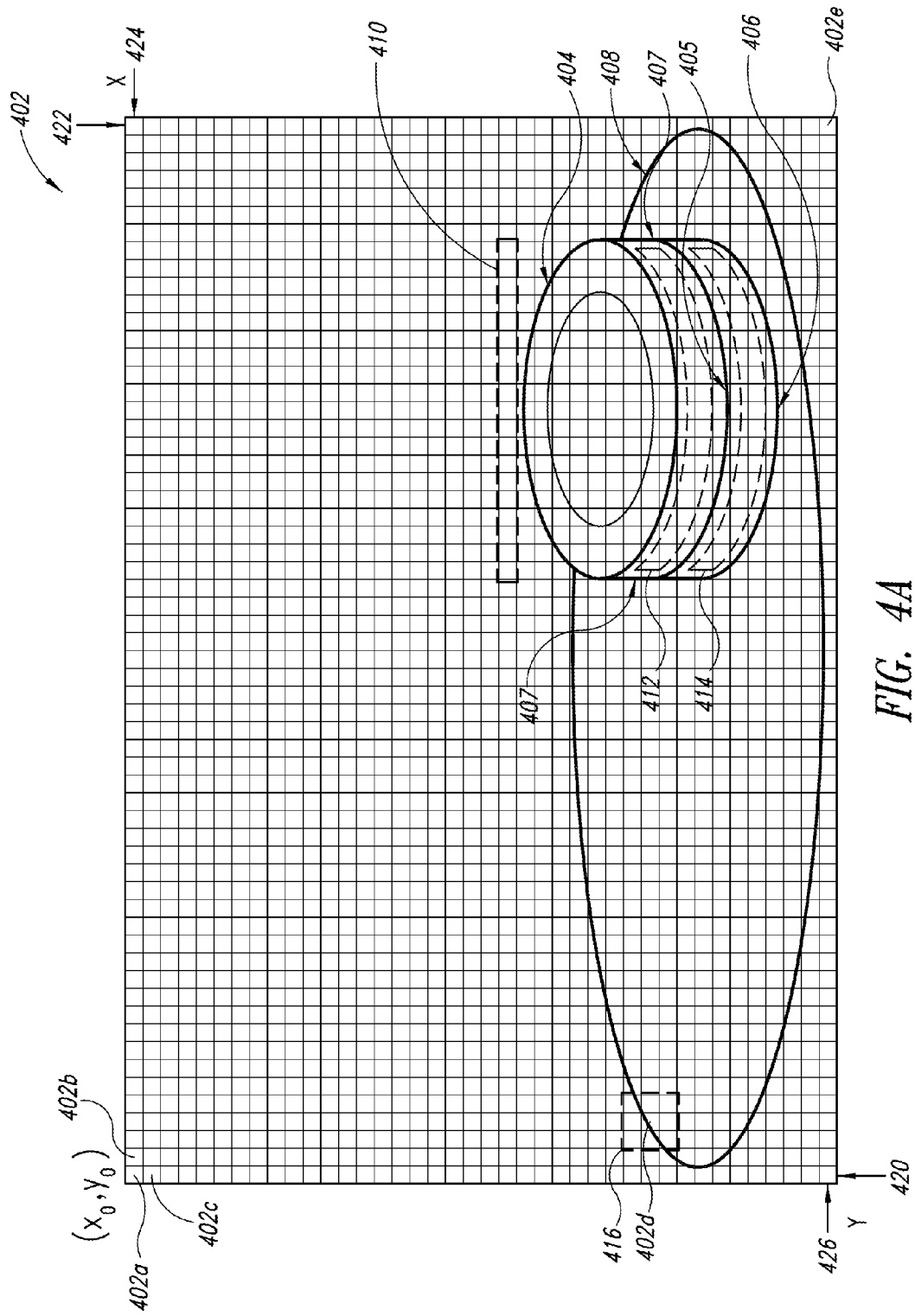
FIGS. 4A and 4B are a representation of contour data of an imaged object stack in a demarcated area corresponding to an image section, according to one illustrated embodiment.
Figure 4B:
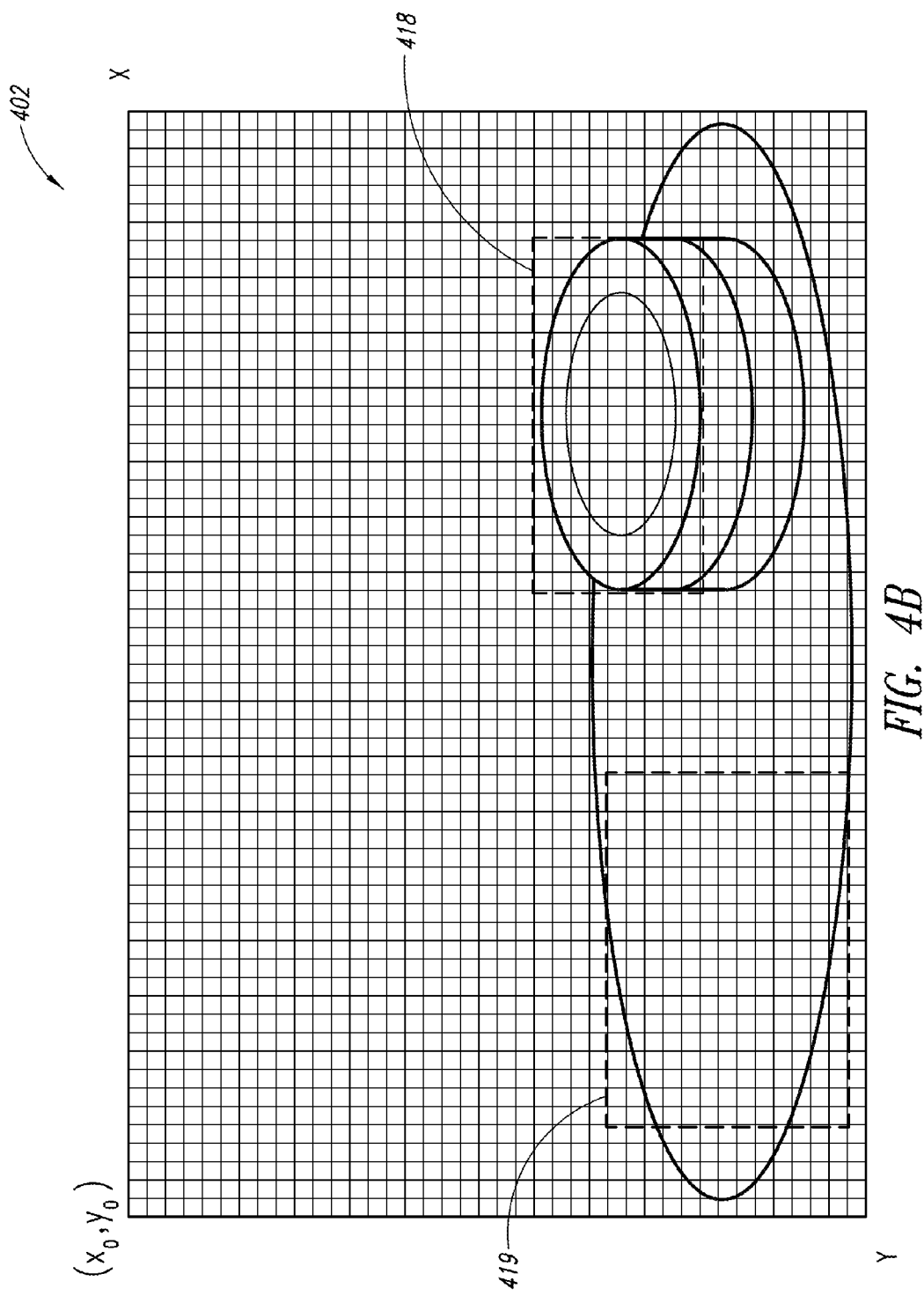

FIGS. 4A and 4B show a representation of a set of target pixel areas 402 associated with an image section of the pixelated image 300, according to one illustrated embodiment. FIGS. 4A and 4B provide context for description of embodiments of an object evaluation routine described with respect to FIGS. 5-16.

In particular, in FIG. 4A, the set of target pixel areas 402 logically subdivides at least a portion of the associated image section into a grid of target pixel areas, with each target pixel area corresponding to a particular n by m pixel area of the image section—target pixel areas are variously referred to as "target quadrants" or "target quads" in some embodiments described herein. In this sense, the term quadrant or quad is not intended to be limiting to an area divided into four sections or sub-areas, but rather is intended to be broad referring to any division of an area without regard to the total number of sections or sub-areas. In some embodiments, the size of the n by m target pixel area may be configurable, such as based on the lighting conditions in the imaging environment.

In one embodiment, the set of target pixel areas spans the entire portion of the image section that may be considered as part of locating a stack of one or more objects (e.g., identifying a top and/or bottom of the stack) positioned within the demarcated area in the associated image section. For example, in a typical embodiment, the set of target pixel areas may span from the leftmost visible portion of the demarcated area to the rightmost visible portion of the demarcated area (e.g., column 420 corresponds to the leftmost portion of the demarcated area, and column 422 corresponds to the rightmost portion of the demarcated area), and from some position above the demarcated area that may correspond to a highest considered elevation of a stack of objects present in the demarcated area to the bottommost visible portion of the demarcated area (e.g., row 424 corresponds to the highest considered elevation, and row 426 corresponds to the bottommost visible portion of the demarcated area).

In at least one embodiment, the target pixel areas of the set of target pixel areas 402 may be 10×10 pixel areas. For example, in such an embodiment, the target pixel area 402a corresponds to a pixel area that includes pixel coordinates ($x_0$, $y_0$) to ($x_0+9$, $y_0+9$) of the associated image section, while a target pixel area 402b corresponds to a pixel area that includes pixel coordinates ($x_0+10$, $y_0$) to ($x_0+19$, $y_0+9$), and a target pixel area 402c corresponds to a pixel area covering pixel coordinates ($x_0$, $y_0+10$) to ($x_0+9$, $y_0+19$), and so on. In this illustrated embodiment, each target pixel area has up to eight neighboring target pixel areas (e.g., above, below, right, left, upper-left, upper-right, lower-left, lower-right). For example, the eight target pixel areas 416 surrounding the target pixel area 402d are neighboring target pixel areas of target pixel are 402d.

As is described in more detail herein, the object evaluation system preprocesses pixels of an image section to determine which pixels of the image section correspond to contours (e.g., edges). For example, each pixel of the image section may be read along with its eight neighboring pixels (e.g., a 3×3 pixel kernel) to determine whether the pixel corresponds to contour, such as by evaluating the contrast between various of the neighboring pixels. Each pixel that is identified as a contour pixel is associated with an appropriate target pixel area of the set of target pixel areas 402 that corresponds to the identified pixel's coordinates, such as based on the identified pixel's coordinates being within the target pixel area. After the contour pixels are subdivided into the set of target pixel areas 402 in such a manner, the object evaluation system may then utilize the set of target pixel areas 402 as part of locating a stack of one or more objects and identifying image data corresponding to each object in the stack, such as locating the top and bottom of the stack of objects. In some embodiments, the object evaluation system may use the location of the top and bottom to determine a total number of chips in the stack and to locate, for each of the one or more objects in the stack, an area of the image section that corresponds to at least a portion of a perimeter of the object, such as the perimeter area 412 corresponding to the top object and the perimeter area 414 corresponding to the bottom object.

In this illustrated embodiment of FIG. 4A, the set of target pixel areas 402 is associated with the image section 304c (FIG. 3A-3B) which includes the object stack 102b (with objects 364 and 366) and the demarcated area 108c. In particular, the preprocessing of the image section 304c may detect contours associated with the objects 364 and 366 (FIG. 3B), such as the edge 404 corresponding to a face ellipse of the top object 364, the edge 405 corresponding to a portion of a bottom ellipse of the top object and/or a portion of a top ellipse of the bottom object, the edge 406 corresponding to a portion of a bottom ellipse of the bottom object 366, and edges 407 corresponding to the sides of the objects, and associated with the demarcated area 108c (FIG. 3A-3B), such as the edge 407. In some embodiments, the top of the stack of objects 102b imaged in the image section 304c corresponds to the edge 404 and the bottom of the stack of objects corresponds to edge 406.

Each pixel of the image section 304c that is determined to correspond to a contour is assigned into a corresponding target pixel area in the set of target pixel areas 402. For the purposes of illustration, it may be assumed that contours are detected corresponding to each of the edges 404-408. As such, any of the target pixel areas that are intersected by one of the edges 404-408 include contour pixels corresponding to a portion of the edge that intersects the target pixel area. For example, the target pixel area 402d includes contour pixels corresponding to the portion of the edge 408 that intersects the target pixel area 402d.

Target pixel areas that do not include any detected contour pixels are considered "empty." For example, target pixel area 402b does not include any edge data, nor does the group of target pixel areas 410, and are thus considered empty target pixel areas. In some embodiments, a group of neighboring target pixel areas that do not include any associated edge data, such as group 410, are referred to as a streak of empty target pixel areas.

It will be appreciated that the edges 404-407 are merely exemplary, and in real-world applications, additional edges may be identified in an image section, such as corresponding to various markings and/or visible designs included on the objects, the surface, or within the demarcated area; and/or other items/information that appears within the image section (e.g., objects or items in the background of the image, etc.); etc. In addition, edges and/or portions of edges associated with one or more objects may be missing, such as if there is insufficient image data to detect an edge or a portion of an edge (e.g., when an edge is in shadow, in dark lighting, obscured). Even in such situations, the techniques described herein may be utilized to evaluate a stack of objects.

In FIG. 4B, an embodiment of a sample bounding box 418 being applied to a group of target pixel areas of the set of target pixel areas 402 is illustrated. The sample bounding box 418 has a height and width that corresponds to the height and width of an object face as it appears in an image section (e.g., such as the calibrated bounding box 370 of FIG. 3B). Another embodiment of a sample bounding box 419 is also being applied to another group of target pixel areas. The sample bounding box 419 has a height that corresponds to the height of the demarcated area (e.g., from the top to the bottom of the demarcated area) as it appears in the image section and a width that corresponds to the width of the object face. The sample bounding boxes 418 and 419 may be used to define groups of target pixel areas of the set of target pixel areas 402, such as for the purposes of locating and/or identifying one or more features of a stack of objects that may be present in the imaged demarcated area, such as described in more detail elsewhere.

Furthermore, although the embodiment of FIGS. 4A and 4B described above use 10×10 pixel target pixel areas, the size of target pixel areas may be smaller or larger in other embodiments. In some embodiments, the size of a target pixel area may be determined based on the lighting conditions in the imaging environment, as low light images may tend to have low contrast which may result in blurred edges, while bright light images may tend to have high contrast which may result in sharper edges. For example, in low light conditions, a larger target pixel area may be preferable (e.g., 10×10 and greater), while in brighter light conditions a smaller target pixel area may be preferable. In addition, although the set of target areas 402 is illustrated as subdividing an entire image section, in other embodiments, the set of target areas may instead correspond to one or more subsections of the image section.

Figure 5:
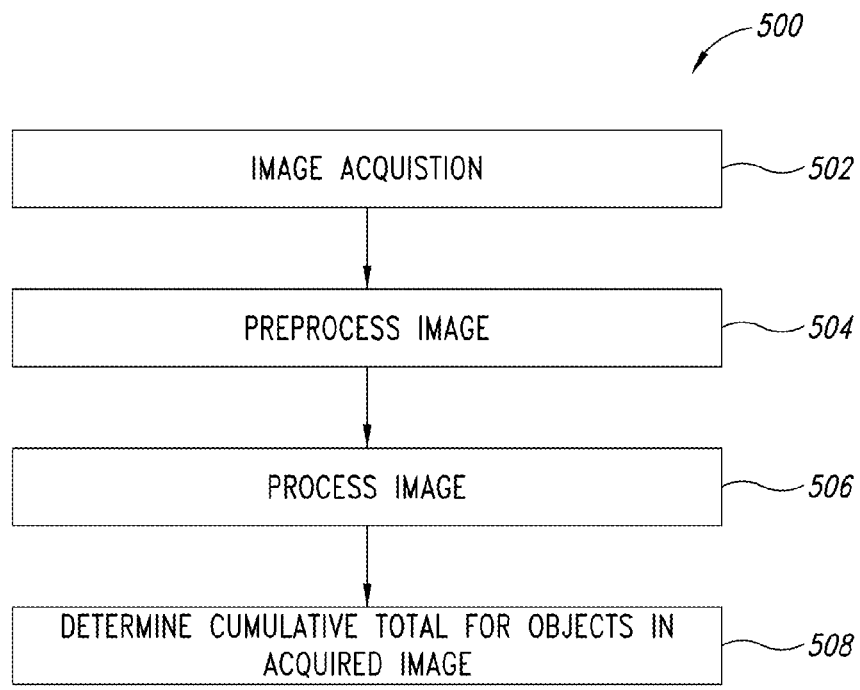
FIG. 5 is a flow diagram of a method of evaluating objects in an image, according to one illustrated embodiment.

FIG. 5 shows a method 500 of operating at least one object evaluation computer system (e.g., system 114 and/or 204 of FIGS. 1 and 2, respectively) to facilitate evaluating a stack of objects in an image, according to one illustrated embodiment.

At 502, the method may acquire or capture a pixelated color image of a surface of a table, the pixelated image including at least one demarcated area which may contain a stack of one or more objects.

At 504, the method may preprocess at least a section of the acquired color image that corresponds to the at least one demarcated area to produce a set of two color contour image data for the section of the acquired color image. In particular, the two color contour image data includes pixels having a first color that corresponds to contour pixels and pixels having a second color that corresponds to non-contour pixels. For example, in some embodiments, white pixels correspond to contour pixels and black pixels correspond to non-contour pixels. In addition, in some embodiments, the at least a section of the acquired color image may include a sub-portion of the acquired color image, while in other embodiments, the at least a portion may include the entire acquired color image.

At 506, the method may process the set of two-color contour data to locate a stack of one or more objects within the demarcated area, if such a stack is present. In particular, as part of such processing, the method may identify from the two color contour data a location of a top of the stack and a location of a bottom of the stack within the image section, as well as determine how many objects are present in the stack.

At 508, the method may determine a cumulative total value for the stack of objects present in the demarcated area, if any. As part of determining a cumulative total value, the method may identify a set of color pixels for each of the objects that are present in the stack, such as based on the determined location of the top and bottom of the stack, and classify each of the objects in the stack into an appropriate color classification based on a respective identified set of color pixel. The method may then determine a value associated with each of the color classifications, and sum each of the determined values to calculate the cumulative total value for the stack.

Although not illustrated in the method 500, in other embodiments, the acquired or captured pixelated color image may include multiple demarcated areas that may each contain a respective stack of one or more objects. In some such embodiments, the method 500 may identify multiple image sections of the acquired image, with each of the identified image sections corresponding respectively to a particular demarcated area of the multiple demarcated areas, and process each of the image sections to evaluate a respective stack of objects that may be present in the image section, such as by performing steps 504-508 for each of the multiple image sections.

Figure 6:
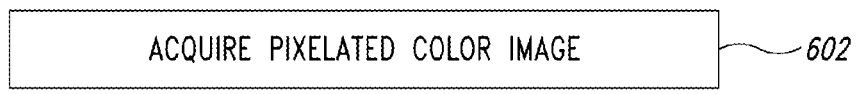
FIG. 6 is a flow diagram of a method of acquiring an image, according to one illustrated embodiment, which may be employed in the method of FIG. 5.

FIG. 6 shows a method 600 of acquiring or capturing an image, according to one illustrated embodiment. The method 600 may be employed in performing the image acquisition of method 500 (FIG. 5).

At 602, an image acquisition device may acquire or capture a pixelated color image of one or more demarcated areas on a surface of a table. The image acquisition device is positioned at non-zero degree and non-perpendicular angle out from the surface of the table and oriented to acquire or capture at least a top surface of a stack of objects located in any of the one or more demarcated areas as well as a portion of a side perimeter of the stack, such as described elsewhere.

Figure 7A:
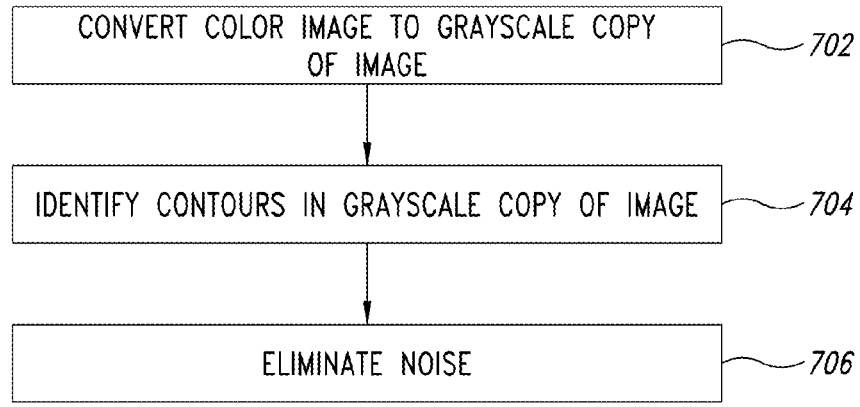
FIG. 7A is a flow diagram of a method of preprocessing a color image, according to one illustrated embodiment, which may be employed in performing the image preprocessing of the method of FIG. 5.

FIG. 7A shows a method 700 of preprocessing at least a section of an acquired or captured color image, according to one illustrated embodiment, which may be employed in performing the image preprocessing of the method 500 (FIG. 5).

At 702, the method may generate a gray scale image from the section of the acquired or captured color image. The gray scale conversion may be performed using any number of known techniques. For example, in some embodiments, the method may convert each color pixel of the section to gray scale by estimating the luminance of the color components (e.g., red, green, and blue) of the pixel and using the estimated luminance to determine a gray scale value for the pixel.

At 704, the method may analyze the gray scale image data to identify contours and produce a set of two color contour data. Contours may be identified by applying an edge detection filter to the gray scale image, with the two color image data produced by associating edge pixels with a first color and non-edge pixels with a second color. In at least one embodiment, edge pixels may be associated with white pixels, while non-edges may be associated with black pixels. Other colors may, of course, be used in other embodiments.

At 706, the method may eliminate noise from the two color contour image data. For example, in some embodiments, the method may eliminate extraneous edge pixels from the two color contour image data, such as edge pixels that are unlikely to correspond to edges of the stack of one or more objects, etc.

Figure 7B:
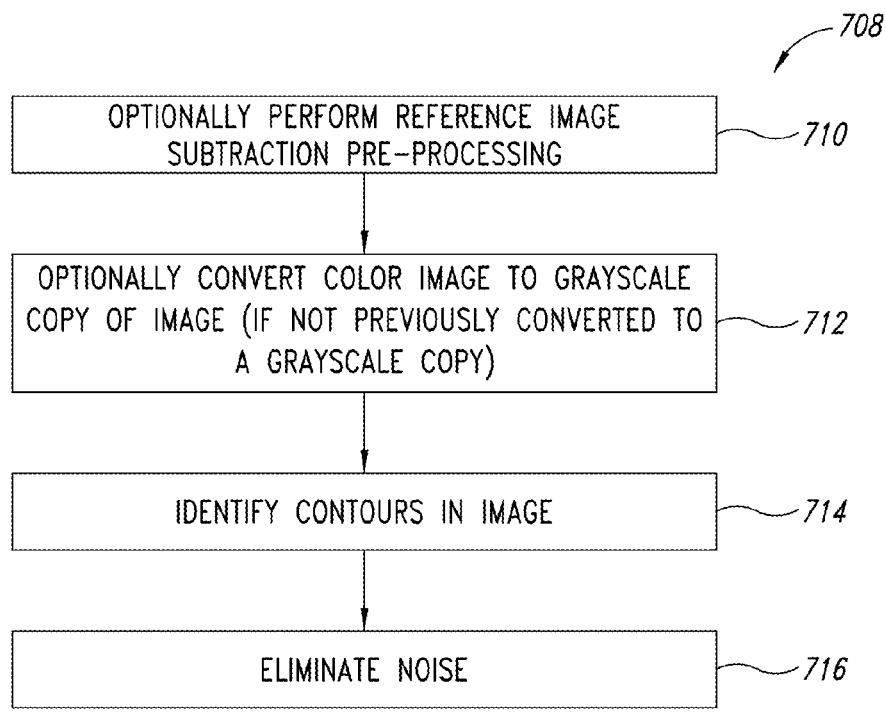
FIG. 7B is a flow diagram of a method of preprocessing a color image including optionally performing reference image subtraction pre-processing, according to one illustrated embodiment, which may be employed in performing the image preprocessing of the method of FIG. 5.

FIG. 7B shows a method 708 of preprocessing a color image, according to one illustrated embodiment, which may be employed in performing the image preprocessing of the method of FIG. 5.

At 710, the method may optionally perform reference image subtraction pre-processing such that markings or irregularities in or on the surface on which the stack of objects is resting may be subtracted or reduced from the pixilated data. This may be performed by comparing a set of pixilated color image data representing the pixelated reference image to the set of two color contour image data of the acquired pixelated color image including the stack of objects. For example, the reference image may be an image of the area on which the stack of objects is resting, but not including the stack of objects. This image may then be subtracted from the acquired or captured color image including the stack of objects, thereby leaving the stack of objects itself as the difference between the images. Further details of such a process are described with reference to FIG. 7C and FIG. 7D below.

At 712, the method may optionally generate a gray scale image from the section of the acquired or captured color image resulting from the subtraction above. The gray scale conversion may be performed using any number of known techniques. For example, in some embodiments, the method may convert each color pixel of the section to gray scale by estimating the luminance of the color components (e.g., red, green, and blue) of the pixel and using the estimated luminance to determine a gray scale value for the pixel.

At 714, the method may analyze the gray scale image data to identify contours and produce a set of two color contour data. Contours may be identified by applying an edge detection filter to the gray scale image, with the two color image data produced by associating edge pixels with a first color and non-edge pixels with a second color. In at least one embodiment, edge pixels may be associated with white pixels, while non-edges may be associated with black pixels. Other colors may, of course, be used in other embodiments.

At 716, the method may eliminate noise from the two color contour image data. For example, in some embodiments, the method may eliminate extraneous edge pixels from the two color contour image data, such as edge pixels that are unlikely to correspond to edges of the stack of one or more objects, etc.

Figure 7C:
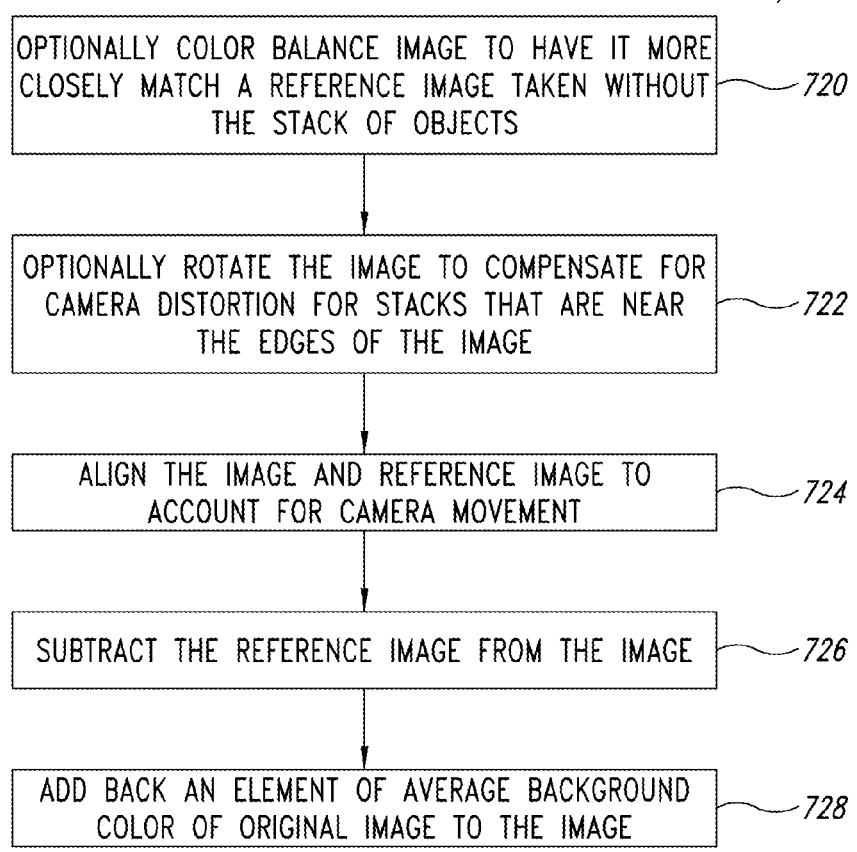
FIG. 7C is a flow diagram of a method of preprocessing a color image including details of optionally performing reference image subtraction pre-processing, according to one illustrated embodiment, which may be employed in performing the image preprocessing of the method of FIG. 7B.

FIG. 7C shows a method 718 of preprocessing a color image including details of optionally performing reference image subtraction pre-processing, according to one illustrated embodiment, which may be employed in performing the image preprocessing of the method of FIG. 7B. In particular, FIG. 7C shows in further details the reference image subtraction pre-processing and other details which may be performed before block 712 of FIG. 7B.

At 720, the method optionally color balances the image to have it more closely match a reference image taken without the stack of objects. For example, this may include color balancing the set of pixilated color image data representing the pixelated reference image having no stack of objects in order to have it more closely match the set of two color contour image data of the acquired pixelated color image that includes the stack of objects.

At 722, the method optionally rotates the image to compensate for camera distortion for stacks that are near the edges of the image. In reference to the present example, the set of two color contour image data may be rotated to compensate for camera distortion for one or more stacks of objects that are near edges of the two color contour image data.

At 724, the method may align the image and reference image (also referred to as image registration) to account for camera movement. In reference to the present example, the method may align the set of pixilated color image data representing the pixelated reference image and the set of two color contour image data to account for movement of an image acquisition device used to acquire the pixelated color image.

At 726, the method may then subtract the reference image from the image. In reference to the present example, the method may subtract the set of pixilated color image data representing the pixelated reference image of the area from the set of two color contour image data. This may eliminate many table markings which would interfere with later steps.

At 728, the method may add back an element of average background color of the original image to the image resulting from the subtraction above of the reference image. Regarding the present example, the method may add back to the set of two color contour image data resulting from the subtraction of the reference image data, image data representing an element of average background color of the area on which the stack of objects is resting.

Figure 7D:
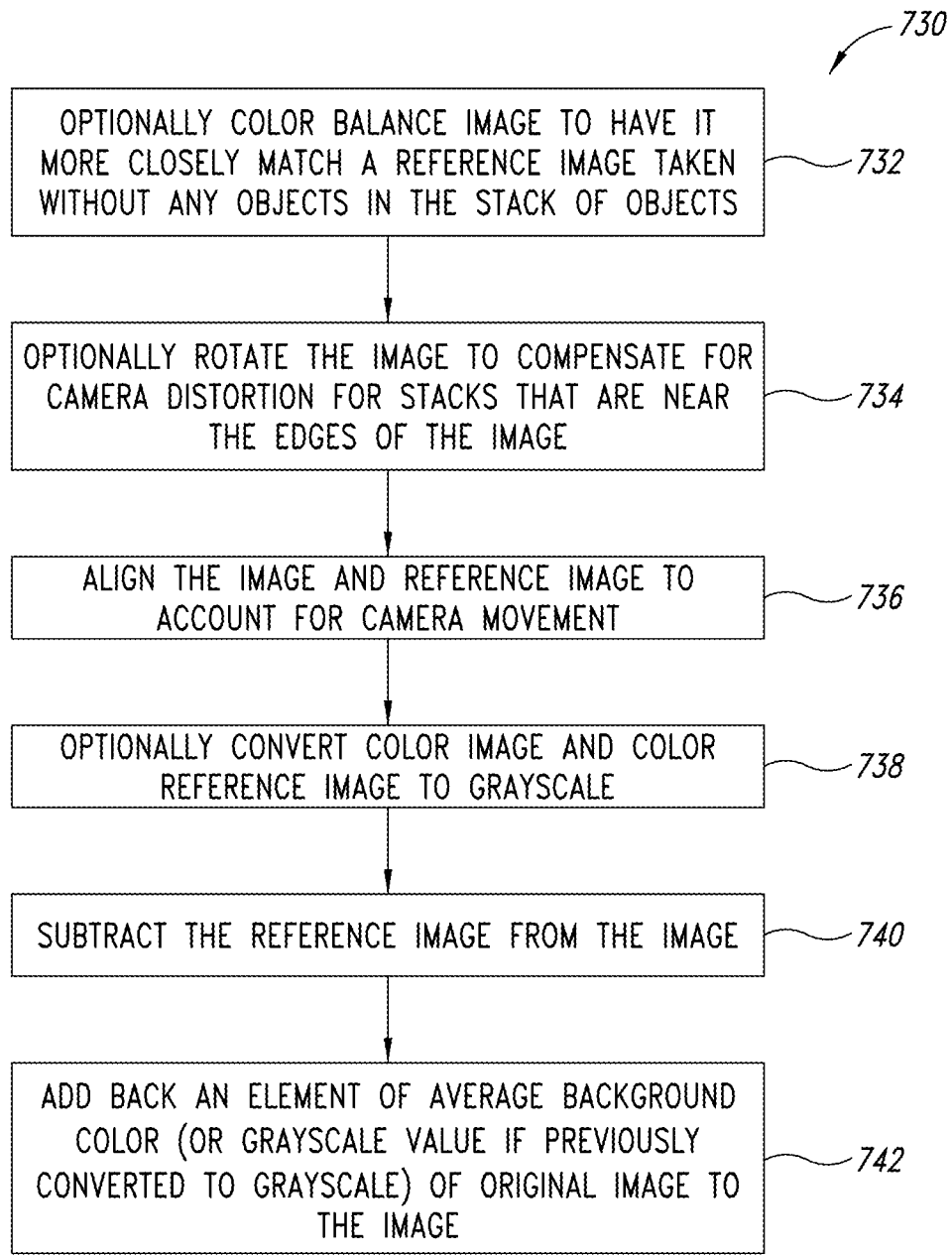
FIG. 7D is a flow diagram of a method of preprocessing a color image including further optional details of performing reference image subtraction pre-processing, according to one illustrated embodiment, which may be employed in performing the image preprocessing of the method of FIG. 7B.

FIG. 7D shows a method 730 of preprocessing a color image including further optional details of performing reference image subtraction pre-processing, according to one illustrated embodiment, which may be employed in performing the image preprocessing of the method of FIG. 7B. In particular, FIG. 7C shows in further details the reference image subtraction pre-processing and other details which may be performed before block 712 of FIG. 7B.

At 732, the method optionally color balances the image to have it more closely match a reference image taken without the stack of objects. For example, this may include color balancing the set of pixilated color image data representing the pixelated reference image having no stack of objects in order to have it more closely match the set of two color contour image data of the acquired pixelated color image that includes the stack of objects.

At 734, the method optionally rotates the image to compensate for camera distortion for stacks that are near the edges of the image. In reference to the present example, the set of two color contour image data may be rotated to compensate for camera distortion for one or more stacks of objects that are near edges of the two color contour image data.

At 736, the method may align the image and reference image to account for camera movement (also referred to as image registration). In reference to the present example, the method may align the set of pixilated color image data representing the pixelated reference image and the set of two color contour image data to account for movement of an image acquisition device used to acquire the pixelated color image.

At 738, the method may optionally convert the color image and color reference image to grayscale. In reference to the present example, the method may optionally convert the set of pixilated color image data representing the pixelated reference image data to gray scale and convert the set of two color contour image data to gray scale if the converting to gray scale had been. The determination of whether to convert the data to gray scale may be based on whether it is likely to improve accuracy of the determining of the total number of objects in the stack. Also, the conversion may occur either before the subtracting described below of the set of pixilated color image data representing the pixelated reference image or after the subtracting described below of the set of pixilated color image data.

At 740, the method may then subtract the reference image from the image. In reference to the present example, the method may subtract the set of pixilated color image data representing the pixelated reference image of the area from the set of two color contour image data. This may eliminate many table markings which would interfere with later steps.

At 742, the method may add back an element of average background color (or gray scale value) of the original image to the image resulting from the subtraction above of the reference image. Regarding the present example, the method may add back to the set of two color contour image data resulting from the subtraction of the reference image data, image data representing an element of average background color (or gray scale value) of the area on which the stack of objects is resting.

Figure 8:
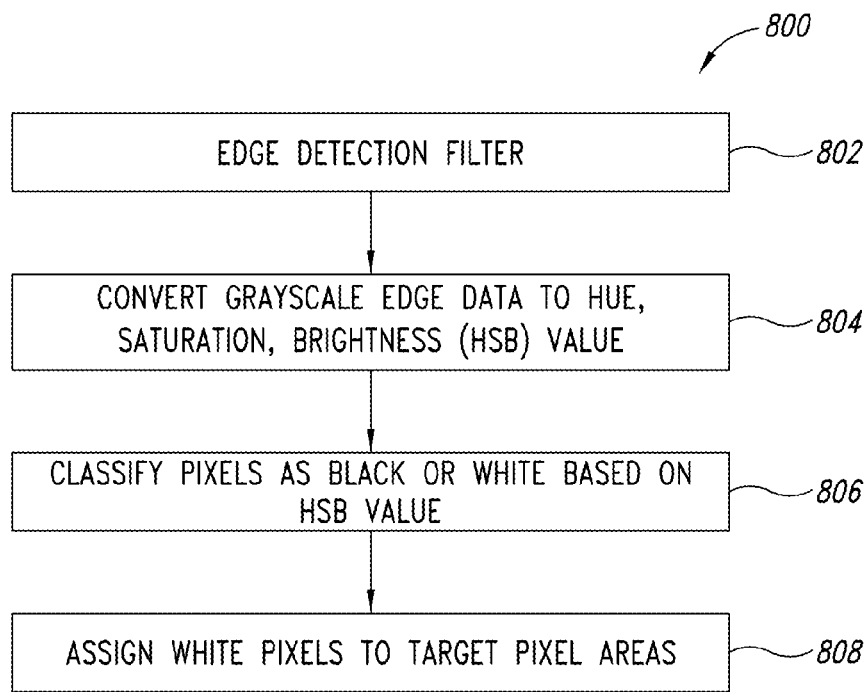
FIG. 8 is a flow diagram of a method of identifying contours in a gray scale image, according to one illustrated embodiment, which may be employed in the method of FIG. 7A.

FIG. 8 shows a method 800 of identifying contours in a gray scale image, according to one illustrated embodiment, which may be employed in the method 700 (FIG. 7A) as part of preprocessing an image section.

At 802, the method may apply an edge detection filter to the gray scale image. For example, in some embodiments, the method may read in pixels from the gray scale image and output a gray scale pixel value for each pixel indicative of a correspondence between the pixel and an edge. In a typical edge detection filter, the output gray scale pixel values range from black (indicating no or a low correspondence to an edge) to white (indicating a high correspondence to an edge), although other color ranges are possible. Various edge detection techniques may be used in various embodiments, such as including, but not limited to, Roberts Cross, Sobel, Canny, and/or other techniques. In at least one embodiment, the method may read a sample pixel and its eight neighboring pixels (e.g., a 3×3 pixel kernel), compare HSB values of various of the neighboring pixels (e.g., by subtracting various of the neighboring pixels from each other), and determine a gray scale pixel value for the sample pixel based on a determined contrast between the various neighboring pixels.

At 804, the method may determine HSB (hue, saturation, and brightness) values for each of the gray scale pixels output from the edge detection filter.

At 806, the method may classify each of the gray scale pixels as being either black or white based on the determined HSB value for the pixel, with white indicating that the pixel is an edge pixel and black indicating that the pixel is not an edge pixel (or at least not an edge pixel of interest). In some embodiments, the pixels may be classified as either black or white based on the intensity of one or more of their HSB values with respect to a range of HSB values. For example, the method may classify pixels having HSB brightness values within a lower range (e.g., 0 to 65) as being black, and may classify pixels having HSB brightness values within a higher range (e.g., 66-100) as being white.

At 808, the method may assign each pixel that is classified at 806 as being white to a corresponding target pixel area of a set of target pixel areas associated with the image section. As previously described with respect to FIG. 4, the set of target pixel areas may be organized as a grid of pixel areas that logically overlays/subdivides the image section. Pixels are assigned to a corresponding target pixel area of the set of target pixel areas based on the pixel's coordinates being within the area covered by the target pixel area. Thus, in this embodiment, the set of target pixel areas only includes pixels that are determined to correspond to edges, which in this example embodiment are pixels that are classified as being white. Of course, the method could operate on the reverse image, classifying the set of target pixels as being black, or some other color.

Figure 9A:
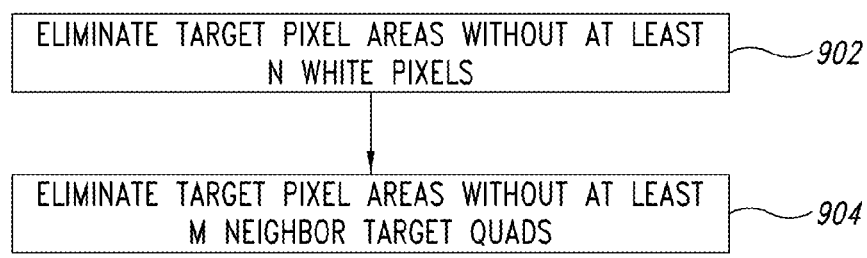
FIG. 9A is a flow diagram of a method of processing contours according to one illustrated embodiment, which may be employed in performing noise elimination of the method of FIG. 7A.

FIG. 9A shows a method 900 of eliminating noise from two color contour image data, according to one illustrated embodiment, which may be employed in the method 700 (FIG. 7A). In particular, the method 900 may be performed after the method 800 (FIG. 8) has subdivided the two color (e.g., black and white) edge data into a set of target pixel areas associated with an image section. In some embodiments, eliminating noise from the two color contour data may remove at least some of the edge pixels (white pixels) from the two color contour data that are not associated with a stack of objects captured in the image section, so as to minimize the amount of edges associated with image data that is not related to the stack of one or more objects, such as edges associated with the demarcated area. In this illustrated embodiment, the noise elimination method 900 may reduce the number of target pixel areas of the set of target pixel areas that have associated white pixels.

At 902, the method may remove white pixels from the two color contour image data if the white pixels are assigned to a target pixel area that contains less than a threshold number of white pixels, essentially making such target pixel areas empty. As one illustrative example, in an embodiment using a 10×10 target pixel area, the threshold may be three pixels.

At 904, the method may further remove white pixels from the two color contour image data if the white pixels are assigned to target pixel areas that do not have a threshold number of neighboring target pixel areas that contain white pixels. As previously noted, in some embodiments each target pixel area may have up to eight neighboring target pixel areas. In some such embodiments, the threshold number of neighboring target pixel areas may be three. In other embodiments, the neighboring target pixel areas may also include target pixel areas that are within a close proximity to the target pixel area being evaluated, but are not necessarily direct neighbors.

The threshold values used at 902 and 904 may vary from embodiment to embodiment. In some embodiments, the threshold values may be adjusted depending on the lighting conditions in the imaging environment.

Figure 9B:
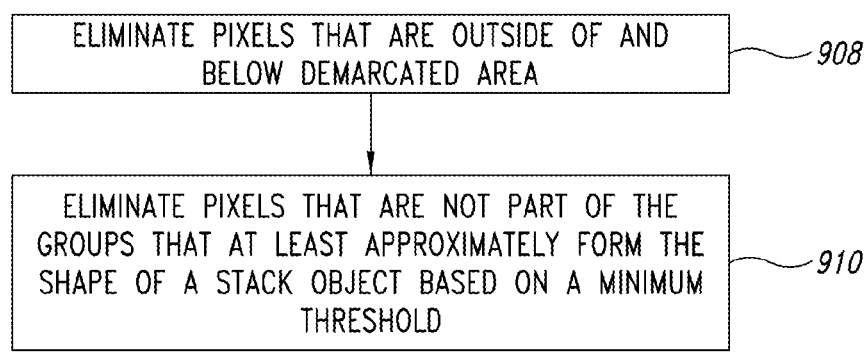
FIG. 9B is a flow diagram of a method of processing contours according to another alternative illustrated embodiment, which may be employed in performing noise elimination of the method of FIG. 7A.

FIG. 9B shows a method 906 of eliminating noise from two color contour image data, according to another alternative illustrated embodiment, which may be employed in the method 700 (FIG. 7A). In particular, the method 906 may be performed after the method 800 (FIG. 8) has subdivided the two color (e.g., black and white) edge data into a set of target pixel areas associated with an image section.

At 908, the method may eliminate pixels that are outside of and below the demarcated area (e.g., the demarcated area 108c of FIG. 3B). In reference to the present example, the method may eliminate extraneous pixels from the set of two color contour image data that are outside the demarcated area.

At 910, pixels may be eliminated that are not part of groups that at least approximately form the shape of a stack object based on a minimum threshold number of pixels. In particular, one way this may be accomplished is by passing a template shaped as a stack object over the set of two color contour image data and then counting a number of contour pixels within an area defined by the template for each location of the template on the set of two color contour image data. All pixels may then be eliminated that are outside the area defined by the template at each location if the number of contour pixels within the area defined by the template contains the minimum threshold number of pixels.

Figure 10A:
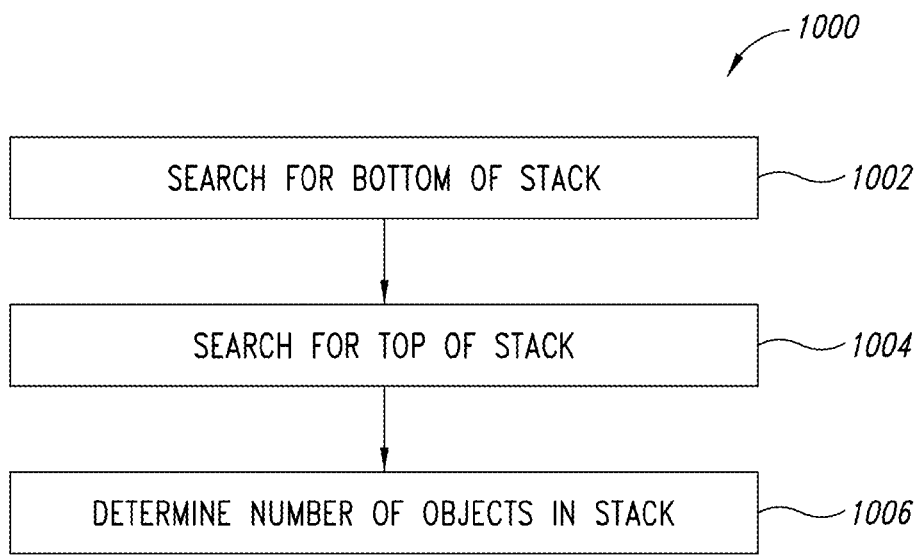
FIG. 10A is a flow diagram of a method of locating a bottom of an object stack, locating a top of the object stack, and determining a number of objects in the object stack according to one illustrated embodiment, which may be employed in performing image processing of the method of FIG. 5.

FIG. 10A shows a method 1000 of processing image data corresponding to an image section to locate a stack of objects within the demarcated area corresponding to the image, according to one illustrated embodiment, which may be employed in performing processing 506 in the method 500 (FIG. 5).

At 1002, the method may search for a bottom of the stack of objects located in the demarcated area, such as by analyzing two color contour data associated with the image section to identify contour data that likely corresponds to the bottom of the stack of objects. For example, in some embodiments, the method may attempt to locate contour data that corresponds to a size and/or shape of an object in a stack as it is likely to appear in the image section when positioned within the demarcated area. If the bottom of the stack is not located, then the method may determine that there is no stack of objects within the demarcated area, at which point the method may end or return to process other potential image sections corresponding to other demarcated areas and/or acquire a new image of the demarcated area. As used herein and in the claims, a stack may include one or more objects, and where multiple objects those objects are carried or placed one on top the other, whether aligned or misaligned.

At 1004, if the bottom of the stack has been located within the demarcated area at 1002, the method may search for a top of the stack of objects, such as by analyzing the two color contour data to identify contour data that likely corresponds to the top of the stack of objects. For example, in some embodiments, the method may locate a top of a stack by analyzing the two color contour data to find a contour corresponding to a face ellipse of an object in the stack. In some embodiments, the method may search for the top of the stack based on knowledge of the location of the bottom of the stack determined at 1002. For example, the method may search for a face ellipse in an area of the two color contour data that is likely to correspond to an object being positioned above the determined bottom of the stack and below a streak of empty target pixel areas (e.g., streak 410 of FIG. 4A).

At 1006, the method determines the number of objects in the object stack based on the determined location of the top and bottom of the stack of objects.

Figure 10B:
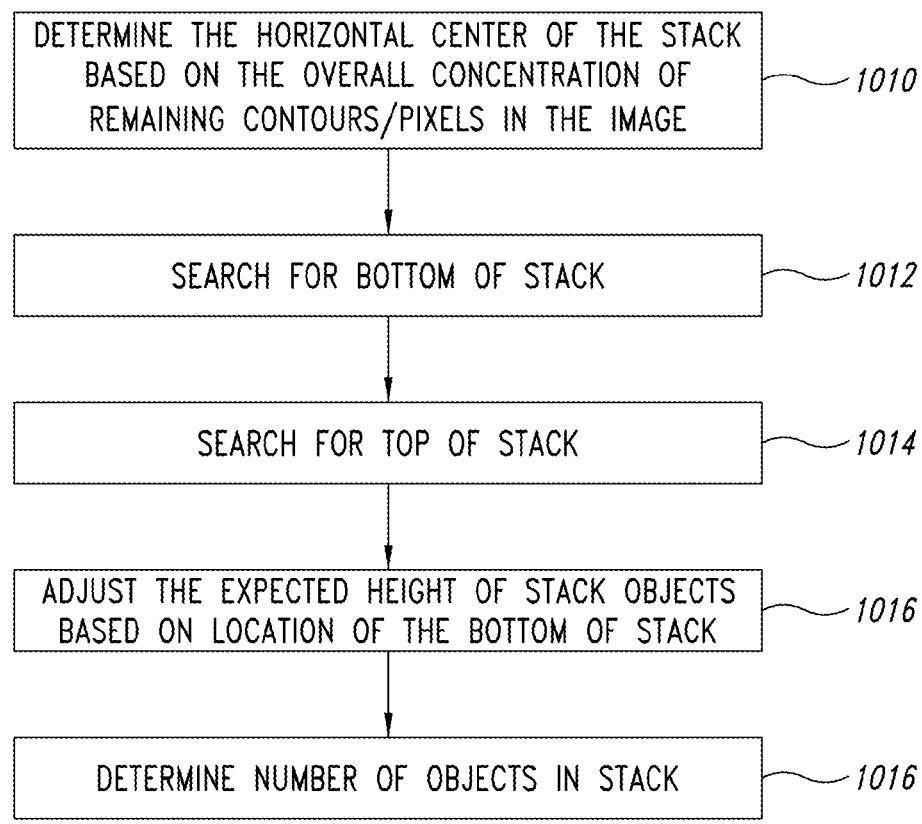
FIG. 10B is a flow diagram of a method of determining a horizontal center of an object stack, locating a bottom of the object stack, locating a top of the object stack, and determining a number of objects in the object stack according to one illustrated embodiment, which may be employed in performing image processing of the method of FIG. 5.

FIG. 10B shows a method 1008 of determining a horizontal center of an object stack, locating a bottom of the object stack, locating a top of the object stack, and determining a number of objects in the object stack according to one illustrated embodiment, which may be employed in performing image processing of the method of FIG. 5.

At 1010, the method may determine the horizontal center of the stack based on the overall concentration of remaining contours/pixels in the image. In reference to the present example, the method may determine a horizontal center of the stack of objects based on an overall concentration of contour pixels in the set of two color contour image data.

At 1012, the method may search for a bottom of the stack of objects located in the demarcated area, such as by analyzing two color contour data associated with the image section to identify contour data that likely corresponds to the bottom of the stack of objects. For example, in some embodiments, the method may attempt to locate contour data that corresponds to a size and/or shape of an object in a stack as it is likely to appear in the image section when positioned within the demarcated area. If the bottom of the stack is not located, then the method may determine that there is no stack of objects within the demarcated area, at which point the method may end or return to process other potential image sections corresponding to other demarcated areas and/or acquire a new image of the demarcated area. As used herein and in the claims, a stack may include one or more objects, and where multiple objects those objects are carried or placed one on top the other, whether aligned or misaligned.

At 1014, if the bottom of the stack has been located within the demarcated area at 1012, the method may search for a top of the stack of objects, such as by analyzing the two color contour data to identify contour data that likely corresponds to the top of the stack of objects. For example, in some embodiments, the method may locate a top of a stack by analyzing the two color contour data to find a contour corresponding to a face ellipse of an object in the stack. In some embodiments, the method may search for the top of the stack based on knowledge of the location of the bottom of the stack determined at 1002 and/or the horizontal center of the stack at 1010. For example, the method may search for a face ellipse in an area of the two color contour data that is likely to correspond to an object being positioned above the determined bottom of the stack and below a streak of empty target pixel areas (e.g., streak 410 of FIG. 4A).

At 1016, the method may adjust the expected height of stack objects based on location of the bottom of stack. In particular, the method may determine this based on a mean/average height of an individual object of the stack rationalized for a distance between an image acquisition device used to acquire the pixelated color image and an expected location of the stack. The distance between an image acquisition device used to acquire the pixelated color image and an expected location of the stack may be adjusted based on the location of the bottom of the stack at the determined horizontal center of the stack relative to the expected location of the stack of objects (e.g., an expected location of the stack of objects in the demarcated area.

At 1018, the method may determine the number of objects in the object stack based on the determined location of the top and bottom of the stack of objects and the adjusted expected height of stack objects.

Figures 11, 12:
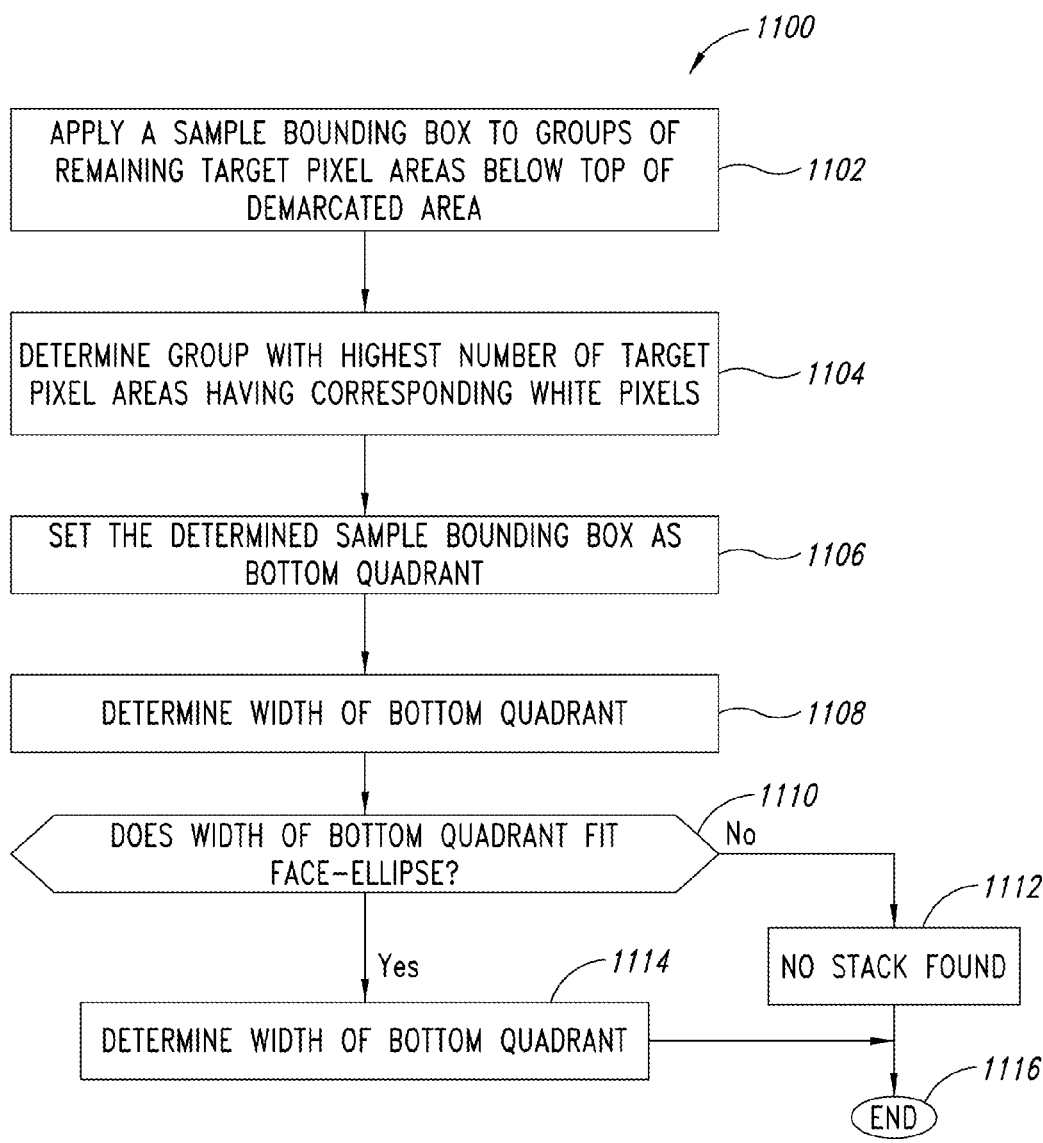
FIG. 11 is a flow diagram of a method of locating a bottom of an object stack according to one illustrated embodiment, which may be employed in the method of FIG. 10A.
FIG. 12 is a flow diagram of a method of determining a bottom of a bottom quadrant according to one illustrated embodiment, which may be employed in the method of FIG. 11.

FIG. 11 shows a method 1100 of locating a bottom of an object stack within a demarcated area according to one illustrated embodiment, which may be employed in the method 1000 (FIG. 10A). In particular, in this embodiment, the method 1100 processes a set of target pixel areas associated with an image section to locate a bottom of a stack of objects, such as the set of target pixel areas generated by method 800 (FIG. 8) and filtered by the noise elimination method 900 (FIG. 9A).

At 1102, the method may apply a sample bounding box to each of multiple groups of target pixel areas of the set of target pixel areas that are located below the top of the demarcated area. The method may use the sample bounding box to identify candidate groups of target pixel areas below the top of the demarcated area that potentially correspond to the bottom of a stack of objects. In a typical embodiment, the top of the demarcated area corresponds to the topmost portion of the demarcated area as it appears in the image section (e.g., the smallest Y pixel coordinate of the demarcated area in the image). Furthermore, the sample bounding box may be defined to have a height that corresponds to the height of the demarcated area as it appears in the image and a width that corresponds to a known width of a face of an object as it appears when positioned within the demarcated area (e.g., box 419 of FIG. 4B). In particular, at 1102, the method may iteratively apply the sample bounding box to groups of target pixel areas by traversing the set of target pixel areas below the demarcated area from left to right, so as to define candidate groups of target pixel areas within the entire demarcated area below the top of the demarcated area.

At 1104, the method may determine which of the candidate groups of target pixel areas defined by the sample bounding box has the largest number of target pixel areas that include white pixels (e.g., edge data).

At 1106, the method may define the bottom quadrant to be the sample bounding box that includes the group of target pixel areas that has the largest number of target pixel areas with white pixels (or the lowest number of empty target pixel areas). The "bottom quadrant" is a sample bounding box that encompasses the group of target pixel areas that potentially includes contour data corresponding to the bottom of a stack of objects present within the demarcated area (if any).

At 1108, the method may determine the width of the bottom quadrant, such as by subtracting the X coordinate of rightmost target pixel area within the bottom quadrant from the X coordinate of the leftmost target pixel area within the bottom quadrant.

At 1110, the method may determine whether the determined width fits dimensions of a known face ellipse of the face of an object as it appears when positioned within the demarcated area (e.g., such as a calibrated face ellipse). For example, the method may compare the width determined at 1108 to a known width of the face ellipse (and/or the width of the sample bounding box). If the result of the comparison is equal and/or within some tolerance (e.g., within 1 or 2 target pixel areas), then the width determined at 1108 is determined to fit the face ellipse. In some embodiments, the tolerance may be configured based on lighting conditions in the environment, such as during a calibration process.

If at 1110 the determined width does not fit the face ellipse, the method may determine at 1112 that no stack of objects is present within the demarcated area.

If instead at 1110 it is determined that the width does fit the face ellipse, the method may determine at 1114 the bottom of the bottom quadrant, which is determined to be the bottom of the stack of objects.

At 1116 the method 1100 may end or terminate.

In some cases, such as if the bottom of the stack is not located, the method may exit and or return to method 500 (FIG. 5) to acquire or capture another image of the demarcated area and/or process another image section corresponding to another demarcated area. In other embodiments, such as when a bottom of the stack is located, the method 1100 may simply return or otherwise end such that further processing of the image section may occur (e.g., to locating a top of the stack, perform color classification, etc.).

It will be appreciated that in other embodiments, the sample bounding box used in the method 1100 may be of different dimensions. For example, in one embodiment, the sample bounding box may have dimensions that correspond to the size of a calibrated object face, such as sample bounding box 418 (FIG. 4B), and in such cases may be iteratively applied to target pixel areas below the target quadrant to locate a group of target quadrants corresponding to a bottom of the stack (e.g., to define the bottom quadrant). In addition, in some embodiments, the width of the bottom quadrant may be determined at 1108 by considering target pixel areas that are located outside of the bottom quadrant, such as target pixel areas that are within a defined proximity of the bottom quadrant.

FIG. 12 shows a method 1200 of determining a bottom of a bottom quadrant or area, according to one embodiment, which may be employed in the method 1100 (FIG. 11).

At 1202, the method may traverse downwardly (in the positive Y direction), starting halfway down from the top of the demarcated area (halfway between the top and bottom of the demarcated area as it appears in the image section), until a last target pixel area that is confined within the left and right coordinates of the of the bottom quadrant or area is found. The last target pixel area refers to one or more target pixel areas of the set of target pixel areas that include white pixels and are closest to the bottom of the demarcated area (e.g., have the highest Y coordinate position) within the left and right boundaries of the bottom quadrant. The bottom of the bottom quadrant may then be set to be a value corresponding to the last target pixel area, e.g., a Y coordinate of the last target pixel area, and/or a Y coordinate of one or more white pixels associated with the last target pixel area.

In some embodiments, the method may not necessarily start from halfway between the top and bottom of the demarcated area. For example, in some embodiments, the method may start at the top of the bottom quadrant and/or from some other position within the demarcated area corresponding to a minimum Y position at which the bottom of a stack of objects may appear in the image section and still be considered to be within the demarcated area. Such is possible since, based on the angle at which the image is acquired or captured, it may be certain that a front edge (i.e., edge closest to the image acquisition device) of a bottommost object in a stack contained within a demarcated area on the surface will appear at least halfway between the top and the bottom of the demarcated area. Such assumption may advantageously speed up processing. Furthermore, in other embodiments, the bottom of the stack may instead be found by locating an elliptical contour at a maximum Y position within the demarcated area that matches the elliptical pattern of at least a bottom portion of a calibrated elliptical object face.

Figure 13:
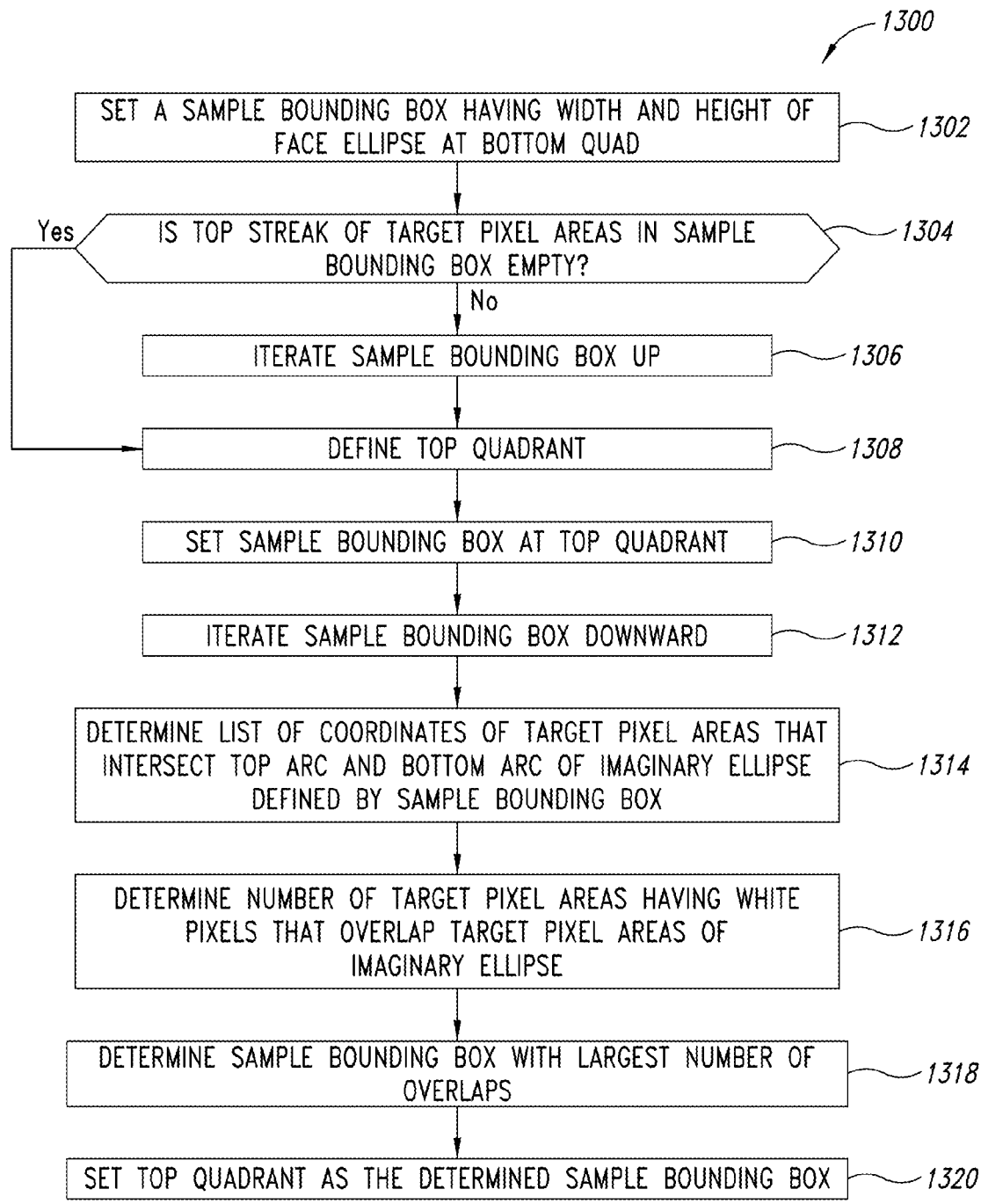
FIG. 13 is a flow diagram of a method of locating a top of an object stack according to one illustrated embodiment, which may be employed in the method of FIG. 10A.

FIG. 13 shows a method 1300 of locating a top of an object stack according to one illustrated embodiment, which may be employed in the method 1000 (FIG. 10A). In particular, in this embodiment, the method 1300 may process a set of target pixel areas associated with the image section to locate a top of a stack of objects, such as after the method 1100 (FIG. 11) has been performed to locate the bottom quadrant.

At 1302, the method may position the sample bounding box at the bottom of the bottom quadrant of the set of target pixel areas, the sample bounding box having a width and height corresponding to the width and height of a known face ellipse of an object face (e.g., box 418 of FIG. 4B). For example, the method may set the sample bounding box such that the bottom of the sample bounding box aligns with the bottom of the bottom quadrant and the left and right of the sample bounding box align respectively with the left and right of the bottom quadrant.

At 1304, the method may determine if the top row of target pixel areas within the sample bounding box contains a streak of empty target pixel areas, such as where all the target pixel areas in the top row are empty. In other embodiments, a top streak of empty target pixel areas may include less than the entire top row, such as a minimum defined streak length. It is noted that depending on where the stack of objects is positioned within the demarcated area and/or depending on the number of the objects in the stack, the top streak of empty target pixel areas may be located above the demarcated area.

At 1306, if a top streak of empty target pixel areas was not found at 1304, the method may iterate the sample bounding box up the set of target pixel areas (in the negative Y direction) until a top streak of empty target pixel areas is located within the sample bounding box or, in some cases, the top of the image section is reached. For example, in some embodiments the sample bounding box may be iterated up by a single row of target pixel areas.

At 1308, after the streak of empty target pixel areas is found, the method may set a top quadrant to be the sample bounding box that includes the determined top row of empty target pixel areas. The top quadrant is a sample bounding box that encompasses a group of target pixel areas that potentially corresponds to the top object in a stack, and will eventually define the location of target pixel areas that are determined to correspond to a face of the top object in the stack.

At 1312, the method may iterate the sample bounding box downward (in the positive Y direction), such as by a single row of target pixel areas.

At 1314, the method may determine a list of coordinates of target pixel areas that intersect a top arc and a bottom arc of an imaginary ellipse defined by the sample bounding box. In some embodiments, the imaginary ellipse defined by the sample bounding box has a height and width that corresponds to the height and width of the sample bounding box (e.g., and thus may correspond to an ellipse having a height and width of a face ellipse of a calibrated object face). The list of coordinates may indicate which of the target pixel areas of the set of target pixel areas that fall within the sample bounding box intersect the top and bottom arcs of the imaginary ellipse. It will be appreciated that in other embodiments, the objects may be of other shapes and/or have faces with shapes other than ellipses (e.g., rectangular, pentagonal, octagonal, etc.), and in such embodiments, the sample bounding box may be used to define an imaginary shape corresponding to the appropriate shape of the face of such objects.

At 1316, the method may determines the number of the target pixel areas indicated by the list of coordinates that have white pixels, and thus the number of target pixel area within the sample bounding box that contain edge data that overlaps with the top and bottom arc of the imaginary ellipse.

At 1318, the method may determine a sample bounding box that has the largest number of overlaps. For example, the method may iteratively move the sample bounding box from the sample bounding box set at 1312 downward (in a positive Y direction) until the bottom of the sample bounding box is positioned at the bottom of the bottom quadrant, determine the number of target areas that intersect the imaginary ellipse at each iteration of the sample bounding box, and identify the sample bounding box that has the largest determined number of overlaps. The sample bounding box that includes the most overlaps is assumed to be the top of the object stack.

At 1320, the method may set the top quadrant to be the determined sampled bounding box that has the largest number of overlaps.

In some embodiments, if the method 1300 is unable to find a sample bounding box that includes at least a minimum number of overlaps (e.g., 90%), then the method may indicate that no stack has been found. Furthermore, in some embodiments, the sample bounding box may also be iterated from left to right, such as within some limited proximity of the left and right of the bottom quadrant, to locate a group of target quadrants that corresponds to the face ellipse. In addition, in some embodiments, the sample bounding box and/or the imaginary ellipse may be expanded and/or contracted as part of locating a group of target quadrants that corresponds to the face ellipse.

Figures 14, 15:
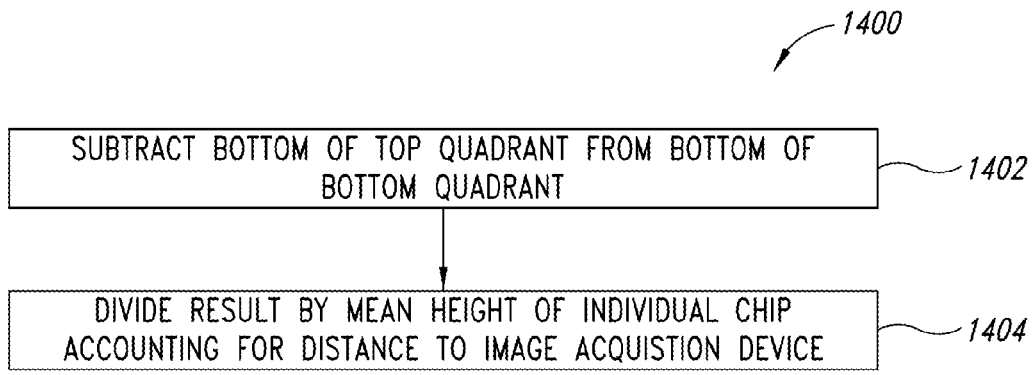
FIG. 14 is a flow diagram of a method of determining a number of objects in an object stack, which may be employed in the method of FIG. 10A00.
FIG. 15 is a flow diagram of a method of determining a cumulative value for objects in an acquired image according to one illustrated embodiment, which may be employed in performing the cumulative total determination of the method of FIG. 5.

FIG. 14 shows a method 1400 of determining a number of objects in an object stack, which may be employed in the method of FIG. 10A00. In particular, in this embodiment, the method 1400 may be performed after methods 1100 (FIG. 11), 1200 (FIG. 12), and 1300 (FIG. 13) have been performed to locate the bottom quadrant and the top quadrant.

At 1402, the method may subtract the bottom of the top quadrant from the top of the bottom quadrant. In some embodiments, the bottom of the top quadrant may be a value that corresponds to a Y position of one or more target pixel areas that are located at the bottom of the top quadrant, and/or to a position of one or more white pixels associated with one or more target pixel areas located at the bottom of the top quadrant. The bottom of the bottom quadrant may be a value that corresponds to a Y position as discussed with respect to the method 1200 (FIG. 12). In particular, the bottom of the top quadrant corresponds to a location of the bottom of a face ellipse of an object positioned at the top of the stack, and the bottom of the bottom quadrant corresponds to a location of the bottom edge (e.g., bottom edge ellipse) of an object positioned at the bottom of the stack within the demarcated area.

At 1404, the method divides the subtracted value by a height of an individual object as the object may appear in the image section (e.g., the mean/average height of the object accounting for distance and orientation with respect to the image acquisition device). The result of the division is determined to be the number of objects in the stack.

FIG. 15 shows a method 1500 of determining a cumulative value for objects in an acquired image according to one illustrated embodiment, which may be employed in performing the method 500 (FIG. 5).

At 1502, the method may determine a color classification for each of the objects in the stack. In particular, the method may identify color pixels from the acquired or captured pixelated color image that correspond to each of the objects in the stack, and classify the color of each of the objects based on the identified pixels. The pixels may be identified based on a determined knowledge of the location of the top and bottom of the object stack, such as locations determined in the method 1000 (FIG. 10A).

At 1504, the method may determine a value of each of the objects based on their respective color classification. In some embodiments, relationships between color classifications and respective values may be configured or otherwise trained and stored in memory (e.g., such as in a table or other data structure), such that the method may retrieve a value associated with a particular color classification.

At 1506, the method sums all of the determined values for each object to determine the total/cumulative value of the objects in the stack.

At 1508, the method returns the sum.

Figure 16A:
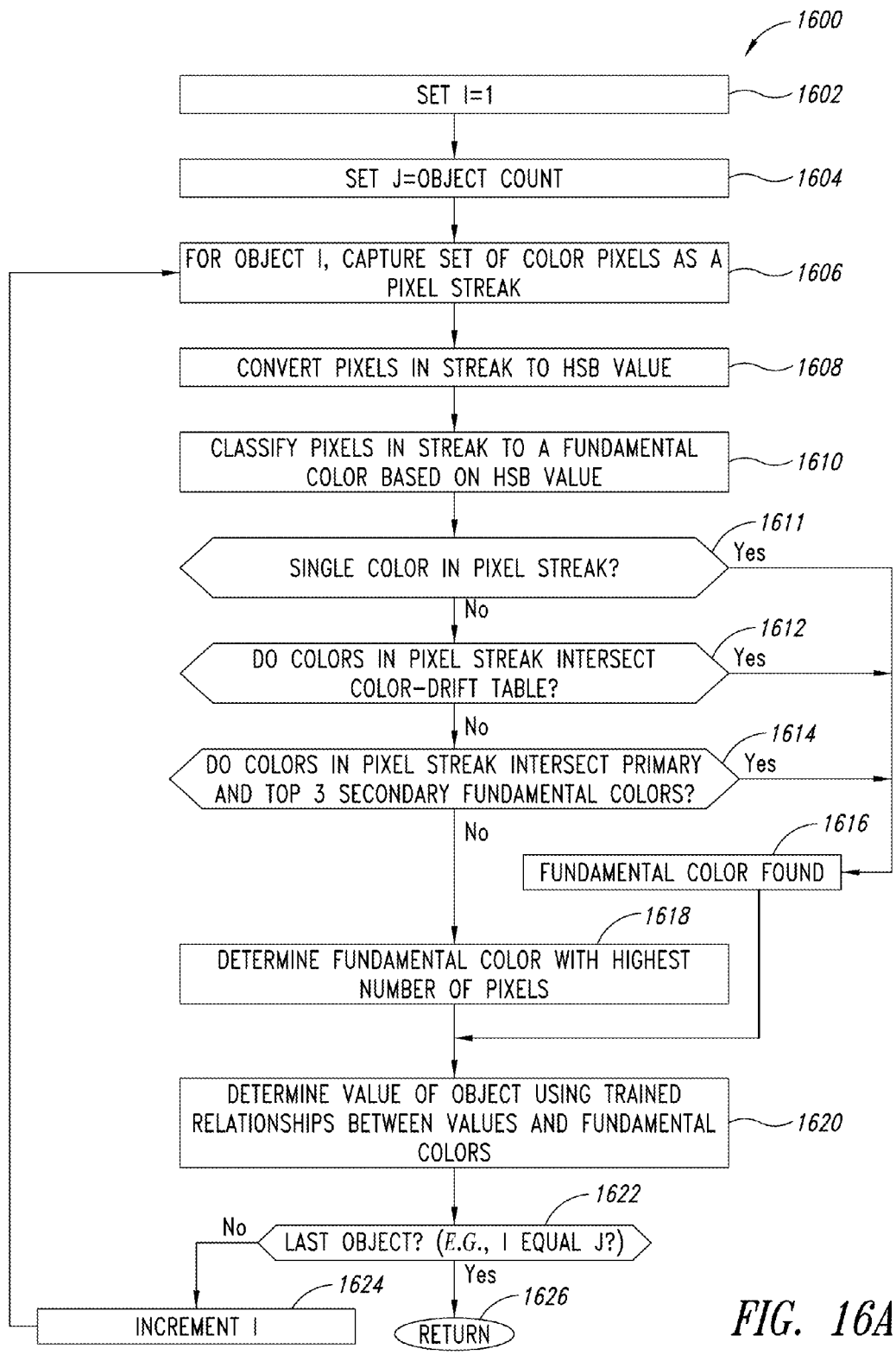
FIG. 16A is a flow diagram of a method of color classifying objects to determine a value according to one illustrated embodiment, which may be employed in performing the color classification of the method of FIG. 15.

FIG. 16A shows a method 1600 of color classifying objects and determining a value for objects based on color classifications, according to one illustrated embodiment, which may be employed in performing the method 1500 (FIG. 15).

At 1602, the method may set an iterator I to 1.

At 1604, the method may set a maximum value J to be the number of objects in the stack, such as the number of objects determined in method 1400 (FIG. 14).

At 1606, the method may acquire or capture a set of color pixels from the acquired pixelated color image as a color pixel streak that corresponds to an object I. The color pixel streak is a group of color pixels that corresponds to at least a portion of a perimeter area of the object I as imaged in the color image.

The color pixel streak may be acquired or captured for the object I based on knowledge of the top of the stack and bottom of the stack. For example, in some embodiments, the method may assume that each of the objects in a stack of objects has elliptical perimeter arcs associated with a top and bottom of the object's visible perimeter (as it appears in the image) that are similar in shape to an elliptical arc of the face ellipse. Thus, after the top quadrant has been located, the method may derive and/or otherwise approximate the locations of the tops and bottoms of an object's visible perimeters. For example, in some embodiments, the method may determine how the face ellipse appears in the image (e.g., such as based on a three-dimensional perspective of the object face), and then may determine the shape of the top and bottom arcs of the object with respect to the face ellipse and where the top and bottom perimeter arcs for the object appears in the image relative to the face ellipse (e.g., such as based on the known and/or determined image height of an object with respect to the determined location of the top of the stack). The location of the top and bottom arc for each Ith image may be determined based an iterated offset (in the positive Y direction) from the location of the top face ellipse.

After the top and bottom arcs corresponding to the perimeter of the Ith object have been determined, the method may select a portion of the color pixels from the pixelated color image located within the area between the top and bottom arcs. In some embodiments, the method may select a portion of the color pixels that corresponds to approximately 30-40% of the width of the object and approximately 90% of the calibrated height of an object, although in other embodiments, the method may select more or less.

At 1608, the method converts the pixels in the color pixel streak into their corresponding HSB values (e.g., using a known technique to convert RGB components of a pixel into HSB values).

At 1610, the method may classify the pixels in the streak into fundamental colors based on the HSB values of the pixels. For example, in some embodiments, a predefined mapping table may be used to map HSB values to corresponding fundamental colors. Fundamental colors, also referred to as "culture colors," may include a set of color categories, such as including red, blue, green, white, black, purple, pink, yellow, brown, gray, and cyan, to which the various HSB values in the streak may be mapped. The term fundamental colors is not intended to be coextensive with the concept of primary colors, but rather is a subset of colors which are distinctly recognized across a variety of human cultures, hence the denomination as culture colors. In some embodiments, the fundamental colors included in the set may be limited to include only those colors that may actually occur in the objects that may be stacked in the demarcated area.

At 1611, the method may determine whether the pixels in the pixel streak have the same color. If so, the method may determine at 1616 that the fundamental color associated with the Ith object is found. If not, the method may continue to 1612.

At 1612, the method may determine whether the colors in the pixel streak intersect a color in a color-drift table. The color drift table may include mappings between the fundamental colors and a set of (or subset of) the possible colors that the fundamental color may drift to under various lighting conditions. If the colors included in the pixel streak is located in the color drift table (e.g., intersect the colors in the table), then the table may identify a corresponding fundamental color based on the drift. The mappings may be predefined mappings and/or otherwise trained/calibrated.

If, at 1612, the colors in the pixel streak intersect the color drift table, then the method may determine at 1616 that the fundamental color associated with the Ith object is found. If instead at 1612, it is determined that two or more fundamental colors are possibly present in the pixel streak, the routine may continue 1614.

At 1614, the method may determine whether the colors in the pixel streak intersect a primary fundamental color and a top one or more secondary fundamental colors. As used herein and in the claim, the term primary is used to refer to a first, most likely or dominate one of the fundamental colors, and is not intended to refer to the concept of primary colors. For example, in some embodiments, the primary fundamental color may be the fundamental color that has the highest ration of corresponding pixels in the streak, and the top secondary fundamental colors are the top most represented fundamental colors in the streak other than the primary fundamental color.

At 1614, the method may determine the primary and top one or more (e.g., three) secondary fundamental colors present in the streak, then may use a lookup table to determine a single resulting fundamental color that the pixel streak corresponds to based on the determined primary and top one or more secondary fundamental colors. The lookup table may, for example, include mappings between combinations of primary and top secondary colors and corresponding resulting fundamental colors. In some embodiments, the lookup table may include ratios of primary and top secondary fundamental colors and a correspondence between such ratios and a resultant fundamental color. The lookup table may be pre-populated with such mappings and/or may be populated with such mappings based on run-time heuristics.

If, at 1614, the colors intersect a primary fundamental color and a top three secondary fundamental colors, then, at 1616, the fundamental color associated with the Ith object is found.

Otherwise, at 1618, the method may determine the fundamental color that corresponds to the highest number of pixels in the pixel streak as being the fundamental color for the object.

At 1620, the method may determine a value of the object based on a trained or otherwise configured relationship between values and fundamental colors. For example, in some embodiments, the relationship may be maintained in a memory (e.g., such as in a table, map, or other data structure), such that a value of the object may be identified based on the determined fundamental color for the object.

At 1622, the method determines whether the Ith object is the last object (e.g., whether I is equal to J). If not, I may be incremented at 1624, and the method may return to 1606 to process the next object. If so, the method may continue to 1626 to return the determined values for each of the objects in the stack.

Figure 16B:
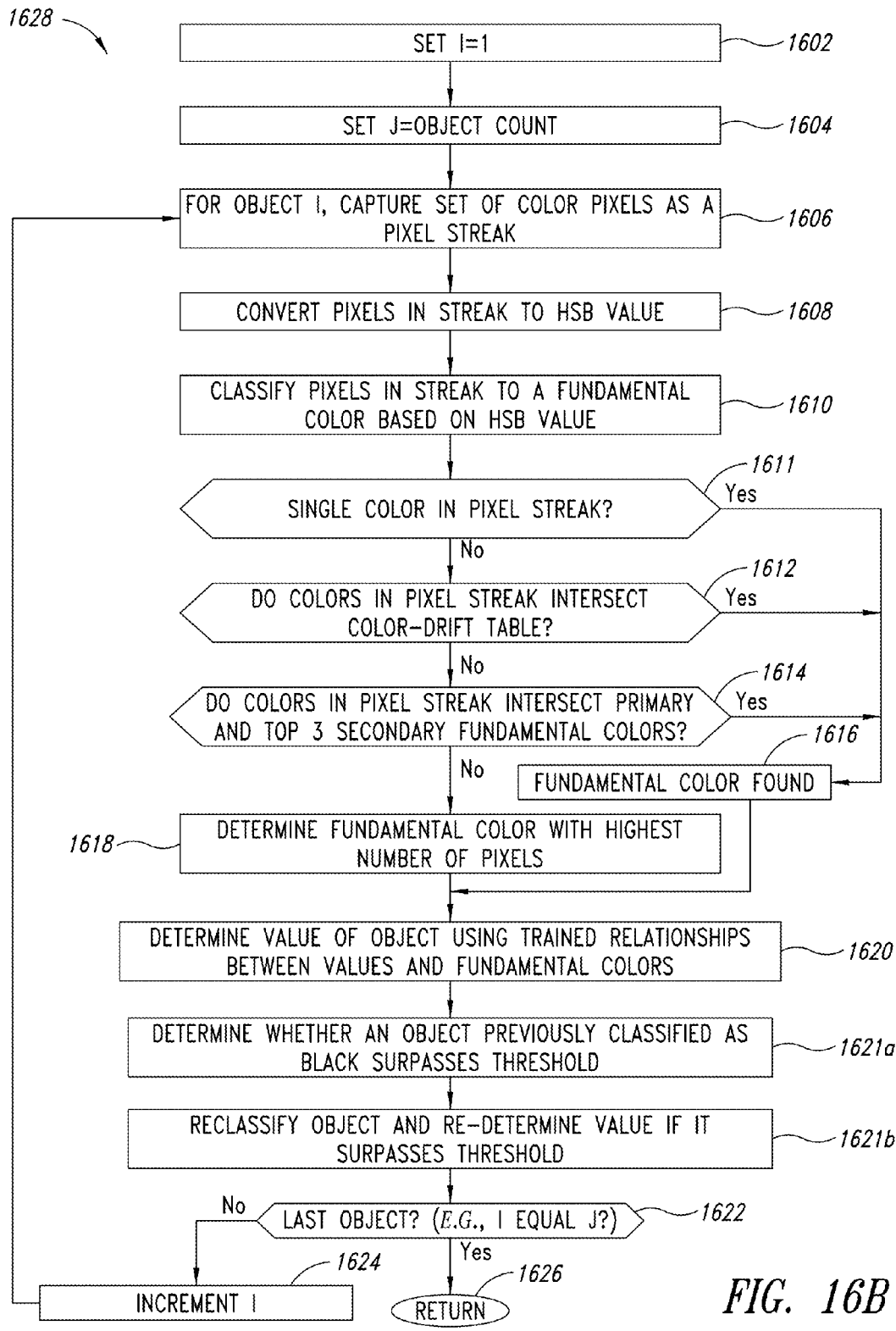
FIG. 16B is a flow diagram of a method of color classifying objects to determine a value according to one illustrated embodiment, including reclassifying particular objects obscured by shadow, which may be employed in performing the color classification of the method of FIG. 15.

FIG. 16B shows a method 1628 of color classifying objects to determine a value according to one illustrated embodiment, including reclassifying particular objects obscured by shadow, which may be employed in performing the color classification of the method of FIG. 15. FIG. 16B is similar to that of FIG. 16A. However, FIG. 16B includes the additional blocks 1621a and 1621b.

At 1621a the method may determine whether an object previously classified as black surpasses threshold. In particular, the method may determine whether pixels of an object previously classified as black surpass a threshold regarding particular (HSB) values of the pixels, which may indicate the object is obscured by a shadow in the pixelated color image. The particular threshold may vary depending on the desired sensitivity to detect a shadow in the image.

At 1621b, the method may reclassify the object and re-determine the value of the object. In particular, the method may reclassify the object into a different color class if the threshold is surpassed and re-determine a value of the object based on the reclassification.

It will be appreciated that in some embodiments, the objects in the stack may be multi-colored, such that the perimeters of the objects include multiple colors. As such, the pixel streak may include pixels corresponding to the multiple colors present on the perimeters. In some such embodiments, the method 1600 may identify multiple colors for the object and determine a value for the object based on the identified multiple colors.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary object evaluation system generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of physical signal bearing media include, but are not limited to, the following: recordable type media such as floppy disks, hard disk drives, CD ROMs, digital tape, and computer memory.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet that are commonly assigned to the same assignee of this application are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method of computationally processing images of areas which may contain objects, the method comprising:
    acquiring a pixelated color image of an area as a set of pixilated color image data at least temporarily stored in at least one processor-readable medium;
    computationally preprocessing by at least one processor the set of pixelated color image data for at least a portion of the area to produce a set of two color contour image data that represents at least the portion of the pixilated color image, wherein a first color of the two color contour image data corresponds to contour pixels and a second color of the two color contour image corresponds to non-contour pixels;
    computationally processing by the at least one processor the set of two color contour image data to find a location of a bottom of a stack of objects in the set of two color contour image data and to find a location of a top of the stack of objects in the set of two color contour image data, if any objects are in the at least portion of the area, wherein the stack of objects includes at least one object if any objects are in the at least portion of the area;
    determining a horizontal center of the stack of objects based on an overall concentration of contour pixels in the set of two color contour image data;
    determining an estimated height of individual objects in the stack of objects based on a mean/average height of an individual object of the stack rationalized for a distance between an image acquisition device used to acquire the pixelated color image and an expected location of the stack, said distance adjusted based on the location of the bottom of the stack at the determined horizontal center of the stack relative to the expected location of the stack of objects; and
    subsequent to determining the horizontal center of the stack of objects and the estimated height of individual objects in the stack of objects, computationally determining by the at least one processor a total number of objects in the stack, if any based at least in part on a knowledge of the location of the bottom of the stack of objects, the location of the top of the stack of objects and the determined estimated height of individual objects in the stack of objects.

2. The method of claim 1 wherein computationally preprocessing by at least one processor the set of pixelated color image data for at least a portion of the area to produce a set of two color contour image data includes:
    converting at least a portion of the set of the pixelated color image data to a set of gray scale image data; and
    edge detection filtering the set of gray scale image data to produce a set of contour image data.

3. The method of claim 2 wherein computationally preprocessing by at least one processor the set of pixelated color image data for at least a portion of the area to produce a set of two color contour image data further includes:
    converting by the at least one processor at least a portion of the set of contour image data to a set of black and white contour image data.

4. The method of claim 1 wherein computationally preprocessing by at least one processor the set of pixelated color image data for at least a portion of the area to produce a set of two color contour image data further includes:
    eliminating extraneous pixels from the set of two color contour image data.

5. The method of claim 3 wherein converting by the at least one processor at least a portion of the set of contour image data to a set of black and white contour image data includes:
    converting by the at least one processor a set of gray scale contour image data to a set of hue, saturation, and brightness (HSB) contour image data; and
    converting by the at least one processor the set of HSB contour image data to the set of black and white contour image data.

6. The method of claim 1 wherein computationally preprocessing by at least one processor the set of pixelated color image data for at least a portion of the area to produce a set of two color contour image data includes:
    color balancing a set of pixilated color image data representing a pixelated reference image of the area to have it more closely match the set of two color contour image data, said reference image having no stack of objects;
    rotating the set of two color contour image data to compensate for camera distortion for one or more stacks of objects that are near edges of the two color contour image data;
    aligning the set of pixilated color image data representing the pixelated reference image and the set of two color contour image data to account for movement of an image acquisition device used to acquire the pixelated color image;
    subtracting the set of pixilated color image data representing a pixelated reference image of the area from the set of two color contour image data;
    adding back to the set of two color contour image data image data representing an element of average background color of the area; and
    either before the subtracting or after the subtracting, converting the set of pixilated color image data representing the pixelated reference image of the area and the set of two color contour image data to gray scale if the converting to gray scale had been determined likely to improve accuracy of the determining of the total number of objects in the stack.

7. A method of computationally processing images of areas which may contain objects, the method comprising:
    acquiring a pixelated color image of an area as a set of pixilated color image data at least temporarily stored in at least one processor-readable medium;
    computationally preprocessing by at least one processor the set of pixelated color image data for at least a portion of the area to produce a set of two color contour image data that represents at least the portion of the pixilated color image, wherein a first color of the two color contour image data corresponds to contour pixels and a second color of the two color contour image corresponds to non-contour pixels, wherein computationally preprocessing by at least one processor to produce the set of two color contour image data further comprises eliminating extraneous pixels from the set of two color contour image data;

computationally processing by the at least one processor the set of two color contour image data to find a location of a bottom of a stack of objects in the set of two color contour image data and to find a location of a top of the stack of objects in the set of two color contour image data, if any objects are in the at least portion of the area, wherein the stack of objects includes at least one object if any objects are in the at least portion of the area; and computationally determining by the at least one processor a total number of objects in the stack, if any based at least in part on a knowledge of the location of the bottom of the stack of objects and the location of the top of the stack of objects.

8. The method of claim 7 wherein computationally preprocessing by at least one processor the set of pixelated color image data for at least a portion of the area to eliminate extraneous pixels from the set of two color contour image data further includes:

eliminating extraneous pixels from the set of two color contour image data that are outside the at least portion of the area; and eliminating extraneous pixels that are not part of groups that at least approximately form the shape of a stack object based on a minimum threshold number of pixels.

9. The method of claim 7 wherein computationally preprocessing by at least one processor the set of pixelated color image data for at least a portion of the area to produce a set of two color contour image data further includes:

logically segmenting the two color contour image data into a set of target pixel areas, each of the target pixel areas including a set of n by m pixels.

10. The method of claim 9 wherein eliminating extraneous pixels from the set of two color contour image data comprises:

for each target pixel area of the set of target pixel areas, eliminating all contour pixels in the target pixel area from the set of two color contour image data if a total number of the contour pixels in the target pixel area is less than a threshold number of pixels per target pixel area; and for each target pixel area of at least some of the set of target pixel areas, eliminating all contour pixels in the target pixel area from the set of two color contour image data if the target pixel area has less than a nearest neighboring threshold number of nearest neighboring target pixel areas.

11. The method of claim 9 wherein computationally processing by the at least one processor the set of two color contour image data to find a location of a bottom and a top of a stack of objects in the set of two color contour image data includes:

successively applying a sample bounding box to groups of target pixel areas of the set of target pixel areas at successive intervals from a determined bottom of the stack of objects until a top streak of target pixel areas contained within the sample bounding box is empty.

12. A system, comprising:

at least one image capturing device that acquires a pixelated color image of an area as a set of pixelated color image data; and at least one object evaluation computing system having at least one processor and at least one storage medium that at least temporarily stores the set of pixelated color image data, wherein the object evaluation computing system:

preprocesses the set of pixelated color image data for at least a portion of the area to produce a set of two color contour image data that represents at least the portion of the pixelated color image, wherein said preprocessing to produce the set of two color image data comprises:

converts at least a portion of the set of the pixelated color image data to a set of gray scale image data, edge detection filters the set of gray scale image data to produce a set of contour image data, converts at least a portion of the set of contour image data to a set of black and white contour image data, converts a set of gray scale contour image data to a set of hue, saturation, and brightness (HSB) contour image data, and converts the set of HSB contour image data to the set of black and white contour image data;

processes the set of two color contour image data to find a location of a bottom of a stack of objects in the set of two color contour image data and to find a location of a top of the stack of objects in the set of two color contour image data, if any objects are in the at least portion of the area, wherein the stack of objects includes at least one object if any objects are in the at least portion of the area; and determines a total number of objects in the stack, if any based at least in part on a knowledge of the location of the bottom of the stack of objects and the location of the top of the stack of objects.

13. The system of claim 12 wherein the at least one object evaluation computing system further logically segments the two color contour image data into a set of target pixel areas, each of the target pixel areas including a set of n by m pixels.

14. The system of claim 12 wherein the at least one object evaluation computing system preprocesses the set of pixelated color image data by:

comparing a set of pixilated color image data representing a pixelated reference image of the area to the set of two color contour image data, said reference image having no stack of objects; and removing irregularities from the set of two color contour image data around a stack of objects in the two color contour image data based on the comparing.

15. The system of claim 12 wherein the at least one object evaluation computing system preprocesses the set of pixelated color image data by:

color balancing a set of pixilated color image data representing a pixelated reference image of the area to have it more closely match the set of two color contour image data, said reference image having no stack of objects;

rotating the set of two color contour image data to compensate for camera distortion for one or more stacks of objects that are near edges of the two color contour image data;

aligning the set of pixelated color image data representing the pixelated reference image and the set of two color contour image data to account for movement of an image acquisition device used to acquire the pixelated color image;

subtracting the set of pixilated color image data representing a pixelated reference image of the area from the set of two color contour image data;

adding back to the set of two color contour image data image data representing an element of average background color of the area; and either before the subtracting or after the subtracting, converting the set of pixilated color image data representing the pixelated reference image of the area and the set of two color contour image data to gray scale if the converting to gray scale had been determined likely to improve accuracy of the determining of the total number of objects in the stack.

16. The system of claim 12 wherein the at least one object evaluation computing system preprocesses the set of pixelated color image data by:
  eliminating extraneous pixels from the set of two color contour image data that are outside the at least portion of the area; and
  eliminating extraneous pixels that are not part of groups that at least approximately form the shape of a stack object based on a minimum threshold number of pixels.

17. The system of claim 16 wherein eliminating extraneous pixels that are not part of groups comprises:
  passing a template shaped as a stack object over the set of two color contour image data;
  counting a number of contour pixels within an area defined by the template for each location of the template on the set of two color contour image data; and
  eliminating all pixels outside the area defined by the template at each location if the number of contour pixels within the area defined by the template contains the minimum threshold number of pixels.

18. The system of claim 17 wherein the at least one object evaluation computing system eliminates extraneous pixels from the set of two color contour image data further by:
  for each target pixel area of the set of target pixel areas, eliminating all contour pixels in the target pixel area from the set of two color contour image data if a total number of the contour pixels in the target pixel area is less than a threshold number of pixels per target pixel area.

19. The system of claim 12 wherein the at least one object evaluation computing system further:
  determines a total number of objects in the stack by determining a difference in the top of the stack of objects and the bottom of the stack of objects and a mean/average height of an individual object rationalized for a distance between the image acquisition device and the stack of objects.

20. The system of claim 12 wherein the at least one object evaluation computing system further:
  reclassifies an object into a different color class based on a determination that a color of the object is obscured by a shadow in the pixelated color image.

21. The system of claim 20 wherein the at least one object evaluation computing system reclassifies an object by:
  determining whether pixels of an object previously classified as black surpass a threshold regarding (HSB) values of the pixels; and
  reclassifying the object into a different color class if the threshold is surpassed;
  and the at least one object evaluation computing system may be further configured to:
  re-determine a value of the object based on the reclassification.

* * * * *